United States Patent
Zhang et al.

(10) Patent No.: US 11,828,172 B2
(45) Date of Patent: Nov. 28, 2023

(54) COMMUNICATION NETWORKS, RELAY NODES FOR COMMUNICATION NETWORKS, AND METHODS OF TRANSMITTING DATA AMONG A PLURALITY OF RELAY NODES

(71) Applicant: ExxonMobil Technology and Engineering Company, Spring, TX (US)

(72) Inventors: Yibing Zhang, Annandale, NJ (US); Limin Song, West Windsor, NJ (US); Mark M. Disko, Glen Gardner, NJ (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 302 days.

(21) Appl. No.: 15/665,931

(22) Filed: Aug. 1, 2017

(65) Prior Publication Data

US 2018/0058206 A1   Mar. 1, 2018

Related U.S. Application Data

(60) Provisional application No. 62/381,330, filed on Aug. 30, 2016, provisional application No. 62/381,335, (Continued)

(51) Int. Cl.
   *E21B 47/16* (2006.01)
   *H04B 11/00* (2006.01)
   (Continued)

(52) U.S. Cl.
   CPC .......... *E21B 47/16* (2013.01); *E21B 41/0085* (2013.01); *E21B 47/005* (2020.05);
   (Continued)

(58) Field of Classification Search
   CPC .. E21B 47/16; E21B 41/0085; E21B 47/0005; E21B 47/0006; E21B 47/18;
   (Continued)

(56) References Cited

U.S. PATENT DOCUMENTS 3,103,643 A   9/1963   Kalbfell ........................ 340/17
3,205,477 A   9/1965   Kalbfell ........................ 340/18
(Continued)

FOREIGN PATENT DOCUMENTS

CN   102733799   6/2014   ............. E21B 47/16
EP   0636763   2/1995   ............. E21B 47/12
(Continued)

OTHER PUBLICATIONS

U.S. Appl. No. 15/666,334, filed Aug. 1, 2017, Walker, Katie M. et al.
(Continued)

*Primary Examiner* — Hai Phan
*Assistant Examiner* — Son M Tang
(74) *Attorney, Agent, or Firm* — ExxonMobil Technology and Engineering Company—Law Department

(57) ABSTRACT

Communication networks, relay nodes for communication networks, and methods of transmitting data among a plurality of relay nodes utilizing non-dispersive guided acoustic waves are disclosed herein. The communication networks include an elongate tubular body and a wireless data transmission network including a plurality of relay nodes. The relay nodes include an electro-acoustic transmitter array and an electro-acoustic receiver. The methods include inducing a first acoustic wave within the elongate tubular body with a first relay node, conveying the first acoustic wave along the elongate tubular body to a second relay node, and receiving the first acoustic wave with the second relay node. The methods further include inducing a second acoustic wave
(Continued)

within the elongate tubular body with the second relay node, conveying the second acoustic wave along the elongate tubular body to a third relay node, and receiving the second acoustic wave with the third relay node.

21 Claims, 9 Drawing Sheets

Related U.S. Application Data filed on Aug. 30, 2016, provisional application No. 62/428,367, filed on Nov. 30, 2016, provisional application No. 62/428,374, filed on Nov. 30, 2016, provisional application No. 62/428,385, filed on Nov. 30, 2016, provisional application No. 62/433,491, filed on Dec. 13, 2016, provisional application No. 62/428,425, filed on Nov. 30, 2016.

(51) Int. Cl.
| | | |
|---|---|---|
| *E21B 47/005* | (2012.01) | |
| *E21B 47/007* | (2012.01) | |
| *E21B 41/00* | (2006.01) | |
| *E21B 47/18* | (2012.01) | |
| *E21B 47/017* | (2012.01) | |

(52) U.S. Cl.
CPC ............ *E21B 47/007* (2020.05); *E21B 47/18* (2013.01); *H04B 11/00* (2013.01); *E21B 47/017* (2020.05); *Y02D 30/70* (2020.08)

(58) Field of Classification Search
CPC ..... E21B 47/011; H04B 11/00; Y02D 70/142; Y02D 70/48
See application file for complete search history.

(56) References Cited

U.S. PATENT DOCUMENTS

| | | | |
|---|---|---|---|
| 3,512,407 A | 5/1970 | Zill | 73/152 |
| 3,543,231 A * | 11/1970 | Cubberly, Jr. | B60Q 9/00 181/104 |
| 3,637,010 A | 1/1972 | Malay et al. | 166/51 |
| 3,741,301 A | 6/1973 | Malay et al. | 166/191 |
| 3,781,783 A | 12/1973 | Tucker | 340/18 |
| 3,790,930 A * | 2/1974 | Lamel | G01H 1/10 367/82 |
| 3,900,827 A * | 8/1975 | Lamel | E21B 47/16 166/113 |
| 3,906,434 A * | 9/1975 | Lamel | E21B 47/16 175/39 |
| 4,001,773 A * | 1/1977 | Lamel | E21B 47/16 175/40 |
| 4,283,780 A | 8/1981 | Nardi | 367/82 |
| 4,298,970 A | 11/1981 | Shawhan et al. | 367/82 |
| 4,302,826 A | 11/1981 | Kent et al. | 367/82 |
| 4,314,365 A | 2/1982 | Peterson et al. | 367/82 |
| 4,884,071 A | 11/1989 | Howard | 340/854 |
| 4,962,489 A | 10/1990 | Medlin et al. | 367/32 |
| 5,128,901 A | 7/1992 | Drumheller | 367/82 |
| 5,136,613 A | 8/1992 | Dumestre, III | 375/1 |
| 5,166,908 A | 11/1992 | Montgomery | 367/165 |
| 5,182,946 A | 2/1993 | Boughner et al. | 73/151 |
| 5,234,055 A | 8/1993 | Cornette | 166/278 |
| 5,283,768 A | 2/1994 | Rorden | 367/83 |
| 5,373,481 A | 12/1994 | Orban et al. | 367/82 |
| 5,468,025 A | 11/1995 | Adinolfe et al. | 285/114 |
| 5,480,201 A | 1/1996 | Mercer | 294/67.31 |
| 5,495,230 A | 2/1996 | Lian | 340/551 |
| 5,530,358 A * | 6/1996 | Wisler | G01V 3/30 324/338 |
| 5,562,240 A | 10/1996 | Campbell | 227/130 |
| 5,592,438 A | 1/1997 | Rorden et al. | 367/83 |
| 5,667,650 A | 9/1997 | Face et al. | 204/298.07 |
| 5,850,369 A | 12/1998 | Rorden et al. | 367/83 |
| 5,857,146 A | 1/1999 | Kido | 455/38.3 |
| 5,924,499 A | 7/1999 | Birchak et al. | 175/40 |
| 5,960,883 A | 10/1999 | Tubel et al. | 166/313 |
| 5,995,449 A | 11/1999 | Green et al. | 367/83 |
| 6,047,602 A * | 4/2000 | Lynnworth | G01F 1/662 73/632 |
| 6,049,508 A | 4/2000 | Deflandre | 367/48 |
| 6,125,080 A | 9/2000 | Sonnenschein et al. | 367/134 |
| 6,128,250 A | 10/2000 | Reid et al. | 367/153 |
| 6,177,882 B1 * | 1/2001 | Ringgenberg | E21B 47/13 340/853.7 |
| 6,236,850 B1 | 5/2001 | Desai | 455/343 |
| 6,239,690 B1 | 5/2001 | Burbidge et al. | 340/10.33 |
| 6,300,743 B1 | 10/2001 | Patino et al. | 320/106 |
| 6,320,820 B1 * | 11/2001 | Gardner | E21B 47/16 340/854.4 |
| 6,324,904 B1 | 12/2001 | Ishikawa et al. | 73/152.03 |
| 6,360,769 B1 | 3/2002 | Brisco | 137/268 |
| 6,394,184 B2 | 5/2002 | Tolman et al. | 166/281 |
| 6,400,646 B1 | 6/2002 | Shah et al. | 367/82 |
| 6,429,784 B1 | 8/2002 | Beique et al. | 340/853.2 |
| 6,462,672 B1 | 10/2002 | Besson | 340/853.2 |
| 6,543,538 B2 | 4/2003 | Tolman et al. | 166/284 |
| 6,670,880 B1 | 12/2003 | Hall et al. | 336/132 |
| 6,679,332 B2 | 1/2004 | Vinegar et al. | 166/373 |
| 6,695,277 B1 | 2/2004 | Gallis | 241/191 |
| 6,702,019 B2 | 3/2004 | Dusterhoft et al. | 166/278 |
| 6,717,501 B2 | 4/2004 | Hall et al. | 336/132 |
| 6,727,827 B1 | 4/2004 | Edwards et al. | 340/854.9 |
| 6,772,837 B2 | 8/2004 | Dusterhoft et al. | 166/278 |
| 6,816,082 B1 | 11/2004 | Laborde | 340/853.3 |
| 6,868,037 B2 | 3/2005 | Dasgupta et al. | 367/54 |
| 6,880,634 B2 | 4/2005 | Gardner et al. | 166/250.01 |
| 6,883,608 B2 | 4/2005 | Parlar et al. | 166/278 |
| 6,899,178 B2 | 5/2005 | Tubel | 166/313 |
| 6,909,667 B2 | 6/2005 | Shah et al. | 367/83 |
| 6,912,177 B2 | 6/2005 | Smith | 367/82 |
| 6,920,085 B2 | 7/2005 | Finke et al. | 367/83 |
| 6,930,616 B2 * | 8/2005 | Tang | G01V 1/44 181/102 |
| 6,940,392 B2 | 9/2005 | Chan et al. | 340/10.4 |
| 6,940,420 B2 * | 9/2005 | Jenkins | E21B 47/16 340/855.4 |
| 6,953,094 B2 | 10/2005 | Ross et al. | 166/381 |
| 6,956,791 B2 | 10/2005 | Dopf et al. | 367/82 |
| 6,980,929 B2 | 12/2005 | Aronstam et al. | 702/188 |
| 6,987,463 B2 | 1/2006 | Beique et al. | 340/856.3 |
| 7,006,918 B2 | 2/2006 | Economides et al. | 702/1 |
| 7,011,157 B2 | 3/2006 | Costley et al. | 166/311 |
| 7,036,601 B2 | 5/2006 | Berg et al. | 166/385 |
| 7,051,812 B2 | 5/2006 | McKee et al. | 166/305.1 |
| 7,064,676 B2 | 6/2006 | Hall et al. | 350/853.1 |
| 7,082,993 B2 | 8/2006 | Ayoub et al. | 166/250.1 |
| 7,090,020 B2 | 8/2006 | Hill et al. | 166/373 |
| 7,140,434 B2 | 11/2006 | Chouzenoux et al. | 166/250.11 |
| 7,219,762 B2 | 5/2007 | James et al. | 181/105 |
| 7,224,288 B2 | 5/2007 | Hall et al. | 340/853.7 |
| 7,228,902 B2 | 6/2007 | Oppelt | 166/250.02 |
| 7,249,636 B2 | 7/2007 | Ohmer | 166/383 |
| 7,252,152 B2 | 8/2007 | LoGiudice et al. | 166/386 |
| 7,257,050 B2 | 8/2007 | Stewart et al. | 367/82 |
| 7,261,154 B2 | 8/2007 | Hall et al. | 166/242.2 |
| 7,261,162 B2 | 8/2007 | Deans et al. | 166/336 |
| 7,275,597 B2 | 10/2007 | Hall et al. | 166/297 |
| 7,277,026 B2 | 10/2007 | Hall et al. | 340/854.8 |
| RE40,032 E | 1/2008 | van Bokhorst et al. | 455/343.2 |
| 7,317,990 B2 | 1/2008 | Sinha et al. | 702/6 |
| 7,321,788 B2 | 1/2008 | Addy et al. | 455/574 |
| 7,322,416 B2 | 1/2008 | Burris, II et al. | 166/308.1 |
| 7,325,605 B2 | 2/2008 | Fripp et al. | 166/250.01 |
| 7,339,494 B2 | 3/2008 | Shah et al. | 340/855.7 |
| 7,348,893 B2 | 3/2008 | Huang et al. | 340/854.3 |
| 7,385,523 B2 | 6/2008 | Thomeer et al. | 340/854.8 |
| 7,387,165 B2 | 6/2008 | Lopez de Cardenas et al. | 166/313 |
| 7,411,517 B2 | 8/2008 | Flanagan | 340/854.4 |

(56) References Cited

U.S. PATENT DOCUMENTS

| | | | | |
|---|---|---|---|---|
| 7,423,931 B2* | | 9/2008 | Martin | H04B 13/00 340/870.01 |
| 7,477,160 B2 | | 1/2009 | Lemenager et al. | 340/853.1 |
| 7,516,792 B2 | | 4/2009 | Lonnes et al. | 166/308.1 |
| 7,551,057 B2 | | 6/2009 | King et al. | 340/5.72 |
| 7,590,029 B2 | | 9/2009 | Tingley | 367/82 |
| 7,595,737 B2 | | 9/2009 | Fink et al. | 340/854.4 |
| 7,602,668 B2 | | 10/2009 | Liang et al. | 367/25 |
| 7,649,473 B2 | | 1/2010 | Johnson et al. | 340/853.1 |
| 7,750,808 B2 | | 7/2010 | Masino et al. | 340/572.1 |
| 7,775,279 B2 | | 8/2010 | Marya et al. | 166/297 |
| 7,787,327 B2 | | 8/2010 | Tang et al. | 367/27 |
| 7,819,188 B2 | | 10/2010 | Auzerais et al. | 155/250 |
| 7,828,079 B2 | | 11/2010 | Oothoudt | 175/20 |
| 7,831,283 B2 | | 11/2010 | Ogushi et al. | 455/574 |
| 7,884,611 B1* | | 2/2011 | Hall | G01V 3/28 324/339 |
| 7,913,773 B2 | | 3/2011 | Li et al. | 175/40 |
| 7,952,487 B2 | | 5/2011 | Montebovi | 340/636.1 |
| 7,994,932 B2 | | 8/2011 | Huang et al. | 340/854.3 |
| 8,004,421 B2 | | 8/2011 | Clark | 340/854.4 |
| 8,044,821 B2 | | 10/2011 | Mehta | 340/855.7 |
| 8,049,506 B2 | | 11/2011 | Lazarev | 324/333 |
| 8,115,651 B2 | | 2/2012 | Camwell et al. | 340/853.2 |
| 8,117,907 B2 | | 2/2012 | Han et al. | 73/152.58 |
| 8,157,008 B2 | | 4/2012 | Lilley | 166/253.1 |
| 8,162,050 B2 | | 4/2012 | Roddy et al. | 166/253.1 |
| 8,220,542 B2 | | 7/2012 | Whitsitt et al. | 166/278 |
| 8,237,585 B2 | | 8/2012 | Zimmerman | 340/854.6 |
| 8,242,923 B2 | | 8/2012 | Prammer | 340/853.7 |
| 8,276,674 B2 | | 10/2012 | Lopez de Cardenas et al. | 166/373 |
| 8,284,075 B2 | | 10/2012 | Fincher et al. | 340/854.4 |
| 8,284,947 B2 | | 10/2012 | Giesbrecht et al. | 381/66 |
| 8,316,936 B2 | | 11/2012 | Roddy et al. | 166/253.1 |
| 8,330,617 B2 | | 12/2012 | Chen et al. | 340/854.6 |
| 8,347,982 B2 | | 1/2013 | Hannegan et al. | 175/5 |
| 8,358,220 B2 | | 1/2013 | Savage | 340/853.1 |
| 8,376,065 B2 | | 2/2013 | Teodorescu et al. | 175/40 |
| 8,381,822 B2 | | 2/2013 | Hales et al. | 166/377 |
| 8,388,899 B2 | | 3/2013 | Mitani et al. | 422/179 |
| 8,411,530 B2 | | 4/2013 | Slocum et al. | 367/90 |
| 8,434,354 B2 | | 5/2013 | Crow et al. | 73/152.04 |
| 8,494,070 B2 | | 7/2013 | Luo et al. | 375/262 |
| 8,496,055 B2 | | 7/2013 | Mootoo et al. | 166/278 |
| 8,539,890 B2 | | 9/2013 | Tripp et al. | 109/25 |
| 8,544,564 B2 | | 10/2013 | Moore et al. | 175/50 |
| 8,552,597 B2 | | 10/2013 | Song et al. | 307/149 |
| 8,556,302 B2 | | 10/2013 | Dole | 285/367 |
| 8,559,272 B2* | | 10/2013 | Wang | G01V 1/46 340/854.3 |
| 8,596,359 B2 | | 12/2013 | Grigsby et al. | 166/278 |
| 8,605,548 B2 | | 12/2013 | Froelich | 367/82 |
| 8,607,864 B2 | | 12/2013 | Mcleod et al. | 166/250.1 |
| 8,664,958 B2 | | 3/2014 | Simon | 324/338 |
| 8,672,875 B2 | | 3/2014 | Vanderveen et al. | 604/67 |
| 8,675,779 B2 | | 3/2014 | Zeppetelle et al. | 375/340 |
| 8,683,859 B2 | | 4/2014 | Godager | 73/152.54 |
| 8,689,621 B2 | | 4/2014 | Godager | 73/152.54 |
| 8,701,480 B2 | | 4/2014 | Eriksen | 73/152.51 |
| 8,750,789 B2 | | 6/2014 | Baldemair et al. | 455/11.1 |
| 8,787,840 B2 | | 7/2014 | Srinivasan et al. | 455/69 |
| 8,805,632 B2 | | 8/2014 | Coman et al. | 702/89 |
| 8,826,980 B2 | | 9/2014 | Neer | 166/255.1 |
| 8,833,469 B2 | | 9/2014 | Purkis | 166/373 |
| 8,893,784 B2 | | 11/2014 | Abad | E21B 43/26 |
| 8,910,716 B2 | | 12/2014 | Newton et al. | 166/373 |
| 8,994,550 B2 | | 3/2015 | Millot et al. | E21B 47/16 |
| 8,995,837 B2 | | 3/2015 | Mizuguchi et al. | H04B 10/27 |
| 9,062,508 B2 | | 6/2015 | Huval et al. | E21B 47/122 |
| 9,062,531 B2 | | 6/2015 | Jones | E21B 47/082 |
| 9,075,155 B2 | | 7/2015 | Luscombe et al. | G01V 1/226 |
| 9,078,055 B2 | | 7/2015 | Nguyen et al. | H04R 5/00 |
| 9,091,153 B2 | | 7/2015 | Yang et al. | E21B 47/12 |
| 9,133,705 B2 | | 9/2015 | Angeles Boza | E21B 47/12 |
| 9,140,097 B2 | | 9/2015 | Themig et al. | E21B 34/12 |
| 9,144,894 B2 | | 9/2015 | Barnett et al. | B25B 17/00 |
| 9,206,645 B2 | | 12/2015 | Hallundbaek | E21B 7/04 |
| 9,279,301 B2 | | 3/2016 | Lovorn et al. | E21B 21/103 |
| 9,284,819 B2 | | 3/2016 | Tolman et al. | E21B 41/00 |
| 9,284,834 B2 | | 3/2016 | Alteirac et al. | E21B 47/12 |
| 9,310,510 B2 | | 4/2016 | Godager | G01V 3/38 |
| 9,333,350 B2 | | 5/2016 | Rise et al. | A61N 1/36082 |
| 9,334,696 B2 | | 5/2016 | Hay | E21B 47/12 |
| 9,359,841 B2 | | 6/2016 | Hall | E21B 23/00 |
| 9,363,605 B2 | | 6/2016 | Goodman et al. | H04R 17/00 |
| 9,376,908 B2 | | 6/2016 | Ludwig et al. | E21B 47/01 |
| 9,441,470 B2 | | 9/2016 | Guerrero et al. | E21B 43/14 |
| 9,515,748 B2 | | 12/2016 | Jeong et al. | G10L 25/90 |
| 9,557,434 B2 | | 1/2017 | Keller et al. | G01V 1/52 |
| 9,617,829 B2 | | 4/2017 | Dale et al. | E21B 41/00 |
| 9,617,850 B2* | | 4/2017 | Fripp | E21B 47/18 |
| 9,631,485 B2 | | 4/2017 | Keller et al. | E21B 47/16 |
| 9,657,564 B2 | | 5/2017 | Stolpman | E21B 47/16 |
| 9,664,037 B2 | | 5/2017 | Logan et al. | E21B 47/122 |
| 9,670,773 B2 | | 6/2017 | Croux | E21B 47/16 |
| 9,683,434 B2 | | 6/2017 | Machocki | E21B 44/00 |
| 9,686,021 B2 | | 6/2017 | Merino | E21B 47/16 |
| 9,715,031 B2 | | 7/2017 | Contant et al. | E21B 47/122 |
| 9,721,448 B2 | | 8/2017 | Wu et al. | G08B 21/20 |
| 9,759,062 B2* | | 9/2017 | Deffenbaugh | E21B 47/14 |
| 9,816,373 B2* | | 11/2017 | Howell | E21B 47/0005 |
| 9,822,634 B2 | | 11/2017 | Gao | E21B 47/16 |
| 9,863,222 B2 | | 1/2018 | Morrow et al. | E21B 43/122 |
| 9,879,525 B2* | | 1/2018 | Morrow | E21B 47/12 |
| 9,945,204 B2 | | 4/2018 | Ross et al. | E21B 33/127 |
| 9,963,955 B2 | | 5/2018 | Tolman et al. | E21B 43/119 |
| 10,100,635 B2 | | 10/2018 | Keller et al. | E21B 47/18 |
| 10,103,846 B2 | | 10/2018 | van Zelm et al. | E21B 47/12 |
| 10,132,149 B2 | | 11/2018 | Morrow et al. | E21B 43/267 |
| 10,145,228 B2 | | 12/2018 | Yarus et al. | E21B 44/00 |
| 10,167,716 B2 | | 1/2019 | Clawson et al. | E21B 47/14 |
| 10,167,717 B2 | | 1/2019 | Deffenbaugh et al. | E21B 47/16 |
| 10,190,410 B2 | | 1/2019 | Clawson et al. | E21B 47/14 |
| 10,196,862 B2 | | 2/2019 | Li-Leger et al. | E21B 17/02 |
| 10,771,326 B2* | | 9/2020 | Zhang | H04L 41/145 |
| 2002/0180613 A1 | | 12/2002 | Shi et al. | E21B 47/18 |
| 2003/0056953 A1 | | 3/2003 | Tumlin et al. | 166/298 |
| 2003/0117896 A1 | | 6/2003 | Sakuma et al. | 367/8 |
| 2004/0020063 A1 | | 2/2004 | Lewis et al. | 33/313 |
| 2004/0200613 A1 | | 10/2004 | Fripp et al. | 166/250.01 |
| 2004/0239521 A1 | | 12/2004 | Zierolf | 340/854.1 |
| 2005/0024232 A1* | | 2/2005 | Gardner | G01V 11/002 340/854.4 |
| 2005/0269083 A1 | | 12/2005 | Burris et al. | 166/255.2 |
| 2005/0284659 A1 | | 12/2005 | Hall et al. | 175/27 |
| 2006/0002232 A1* | | 1/2006 | Shah | E21B 47/16 367/82 |
| 2006/0033638 A1 | | 2/2006 | Hall et al. | 340/854.6 |
| 2006/0041795 A1 | | 2/2006 | Gabelmann et al. | 714/699 |
| 2006/0090893 A1 | | 5/2006 | Sheffield | 166/250.15 |
| 2007/0139217 A1 | | 6/2007 | Beique et al. | 340/856.3 |
| 2007/0146351 A1 | | 6/2007 | Katsurahira et al. | 345/179 |
| 2007/0156359 A1* | | 7/2007 | Varsamis | G01V 1/44 702/69 |
| 2007/0219758 A1 | | 9/2007 | Bloomfield | 702/190 |
| 2007/0272411 A1 | | 11/2007 | Lopez de Cardenas et al. | 166/305.1 |
| 2008/0030365 A1 | | 2/2008 | Fripp et al. | E21B 47/16 |
| 2008/0058597 A1* | | 3/2008 | Arneson | A61B 1/041 600/117 |
| 2008/0110644 A1 | | 5/2008 | Howell et al. | 166/387 |
| 2008/0185144 A1 | | 8/2008 | Lovell | 166/250.17 |
| 2008/0265892 A1* | | 10/2008 | Snyder | G01V 3/28 324/339 |
| 2008/0304360 A1 | | 12/2008 | Mozer | 367/117 |
| 2008/0312839 A1* | | 12/2008 | Mathiszik | G01V 1/50 702/11 |
| 2009/0003133 A1 | | 1/2009 | Dalton et al. | 367/82 |
| 2009/0030614 A1 | | 1/2009 | Carnegie et al. | 702/6 |
| 2009/0034368 A1 | | 2/2009 | Johnson | 367/83 |
| 2009/0045974 A1 | | 2/2009 | Patel | 340/854.6 |

(56) References Cited

U.S. PATENT DOCUMENTS

| | | | |
|---|---|---|---|
| 2009/0080291 A1 | 3/2009 | Tubel et al. ............... 367/81 |
| 2009/0084176 A1* | 4/2009 | Hassan ............... E21B 47/08 |
| | | | 73/152.57 |
| 2009/0139337 A1* | 6/2009 | Owens ............... G01N 29/50 |
| | | | 73/622 |
| 2009/0166031 A1* | 7/2009 | Hernandez ........... E21B 21/08 |
| | | | 166/250.01 |
| 2010/0013663 A1 | 1/2010 | Cavender et al. ........ 340/854.3 |
| 2010/0089341 A1 | 4/2010 | Rioufol et al. ........... 73/152.28 |
| 2010/0333004 A1 | 6/2010 | Burleson et al. ............ 175/2 |
| 2010/0182161 A1* | 7/2010 | Robbins ............... E21B 47/122 |
| | | | 340/853.7 |
| 2010/0212891 A1 | 8/2010 | Stewart et al. ........ 166/250.12 |
| 2011/0061862 A1 | 3/2011 | Loretz et al. ........... 166/250.11 |
| 2011/0066378 A1 | 3/2011 | Lerche et al. ................. 702/6 |
| 2011/0168403 A1 | 7/2011 | Patel ........................ 166/373 |
| 2011/0188345 A1* | 8/2011 | Wang ...................... G01V 1/46 |
| | | | 367/34 |
| 2011/0280102 A1* | 11/2011 | Wang ...................... G01V 1/50 |
| | | | 367/31 |
| 2011/0297376 A1 | 12/2011 | Holderman et al. ........ 166/278 |
| 2011/0297673 A1 | 12/2011 | Zbat et al. ................... 219/756 |
| 2011/0301439 A1 | 12/2011 | Albert et al. ................ 600/301 |
| 2011/0315377 A1 | 12/2011 | Rioufol ..................... 166/250.17 |
| 2012/0043079 A1 | 2/2012 | Wassouf et al. ........... 166/250 |
| 2012/0069708 A1* | 3/2012 | Swett ..................... B06B 1/0618 |
| | | | 367/81 |
| 2012/0126992 A1* | 5/2012 | Rodney ............... E21B 33/0355 |
| | | | 340/850 |
| 2012/0135692 A1* | 5/2012 | Feri ........................ G08C 17/02 |
| | | | 455/67.14 |
| 2012/0147921 A1* | 6/2012 | Conti ...................... F27D 21/00 |
| | | | 374/140 |
| 2012/0152562 A1 | 6/2012 | Newton et al. .............. 166/369 |
| 2012/0179377 A1 | 7/2012 | Lie ................................ 702/6 |
| 2012/0211650 A1* | 8/2012 | Jones ..................... E21B 47/102 |
| | | | 250/269.1 |
| 2013/0000981 A1 | 1/2013 | Grimmer et al. ............ 175/45 |
| 2013/0003503 A1 | 1/2013 | L'Her et al. ................ 367/106 |
| 2013/0106615 A1 | 5/2013 | Prammer ................. 340/854.6 |
| 2013/0138254 A1 | 5/2013 | Seals et al. ................ 700/282 |
| 2013/0192823 A1 | 8/2013 | Barrilleaux et al. ...... 166/250.01 |
| 2013/0248172 A1 | 9/2013 | Angeles Boza et al. |
| 2013/0278432 A1* | 10/2013 | Shashoua ............... G01V 3/18 |
| | | | 340/853.7 |
| 2013/0319102 A1 | 12/2013 | Riggenberg et al. ....... 73/152.28 |
| 2014/0060840 A1 | 3/2014 | Hartshorne et al. ......... 166/300 |
| 2014/0062715 A1 | 3/2014 | Clark ........................ 340/853.2 |
| 2014/0102708 A1 | 4/2014 | Purkis et al. ............. 166/308.1 |
| 2014/0133276 A1 | 5/2014 | Volker et al. ............... 367/82 |
| 2014/0152659 A1 | 6/2014 | Davidson et al. ........... 345/420 |
| 2014/0153368 A1* | 6/2014 | Bar-Cohen ............. E21B 47/14 |
| | | | 367/81 |
| 2014/0166266 A1 | 6/2014 | Read ........................ 166/250.01 |
| 2014/0170025 A1* | 6/2014 | Weiner ................ G01N 33/2823 |
| | | | 422/82.01 |
| 2014/0266769 A1 | 9/2014 | van Zelm ................ 340/854.3 |
| 2014/0278193 A1* | 9/2014 | Breon ..................... G06F 15/00 |
| | | | 702/113 |
| 2014/0327552 A1 | 11/2014 | Filas et al. ................ 340/854.6 |
| 2014/0352955 A1 | 12/2014 | Tubel et al. .............. 166/250.15 |
| 2015/0003202 A1 | 1/2015 | Palmer et al. ............... 367/82 |
| 2015/0009040 A1* | 1/2015 | Bowles .................. E21B 47/13 |
| | | | 340/854.6 |
| 2015/0015413 A1* | 1/2015 | Gao ........................ E21B 47/16 |
| | | | 340/854.4 |
| 2015/0027687 A1 | 1/2015 | Tubel ............................ 166/72 |
| 2015/0041124 A1 | 2/2015 | Rodriguez ................. 166/255.1 |
| 2015/0041337 A1 | 2/2015 | Rodriguez .................... 166/301 |
| 2015/0077265 A1* | 3/2015 | Gao .......................... E21B 17/10 |
| | | | 340/853.7 |
| 2015/0152727 A1 | 6/2015 | Fripp et al. ................ E21B 47/14 |
| 2015/0159481 A1 | 6/2015 | Mebarkia et al. ........ E21B 47/065 |
| 2015/0167425 A1 | 6/2015 | Hammer et al. ......... E21B 34/06 |
| 2015/0176370 A1 | 6/2015 | Greening et al. ........ E21B 41/00 |
| 2015/0285066 A1* | 10/2015 | Keller .................... E21B 47/011 |
| | | | 367/82 |
| 2015/0292319 A1* | 10/2015 | Disko ..................... E21B 47/14 |
| | | | 367/82 |
| 2015/0292320 A1 | 10/2015 | Lynk et al. ............... E21B 47/16 |
| 2015/0300159 A1 | 10/2015 | Stiles et al. ............... E21B 47/16 |
| 2015/0330200 A1 | 11/2015 | Richard et al. ........... E21B 44/00 |
| 2015/0337642 A1 | 11/2015 | Spacek .................... E21B 44/005 |
| 2015/0354351 A1* | 12/2015 | Morrow ................... E21B 47/01 |
| | | | 367/82 |
| 2015/0377016 A1* | 12/2015 | Ahmad ..................... E21B 47/16 |
| | | | 340/855.8 |
| 2016/0010446 A1 | 1/2016 | Logan et al. ............. E21B 47/122 |
| 2016/0033664 A1* | 2/2016 | Cheng ..................... E21B 47/00 |
| | | | 73/152.57 |
| 2016/0047230 A1 | 2/2016 | Livescu et al. ........... E21B 47/10 |
| 2016/0047233 A1 | 2/2016 | Butner et al. ............. E21B 47/12 |
| 2016/0047238 A1* | 2/2016 | Zeroug ................... E21B 47/0005 |
| | | | 367/86 |
| 2016/0076363 A1 | 3/2016 | Morrow et al. .......... E21B 47/12 |
| 2016/0090834 A1 | 3/2016 | Morrow et al. |
| 2016/0109606 A1* | 4/2016 | Market .................... G01V 1/50 |
| | | | 367/25 |
| 2016/0208604 A1* | 7/2016 | Cao ......................... E21B 47/14 |
| 2016/0208605 A1* | 7/2016 | Morrow ................... E21B 43/122 |
| 2016/0215612 A1* | 7/2016 | Morrow ................... E21B 47/01 |
| 2017/0138185 A1* | 5/2017 | Saed ........................ E21B 47/16 |
| 2017/0145811 A1 | 5/2017 | Robison et al. ......... E21B 47/0007 |
| 2017/0152741 A1 | 6/2017 | Park et al. ................. E21B 47/123 |
| 2017/0167249 A1* | 6/2017 | Lee et al. ................. E21B 47/14 |
| 2017/0204719 A1 | 7/2017 | Babakhani ............... E21B 47/0005 |
| 2017/0254183 A1* | 9/2017 | Vasques ................... E21B 41/0085 |
| 2017/0293044 A1 | 10/2017 | Gilstrap et al. ........... G01V 1/50 |
| 2017/0314386 A1* | 11/2017 | Orban ..................... E21B 47/082 |
| 2018/0003843 A1* | 1/2018 | Hori ....................... E21B 47/0005 |
| 2018/0010449 A1 | 1/2018 | Roberson et al. ........ E21B 47/16 |
| 2018/0058191 A1 | 3/2018 | Romer et al. ............ E21B 47/0007 |
| 2018/0058198 A1 | 3/2018 | Ertas et al. ............... E21B 47/12 |
| 2018/0058202 A1* | 3/2018 | Disko ...................... E21B 47/011 |
| 2018/0058203 A1 | 3/2018 | Clawson et al. .......... E21B 47/14 |
| 2018/0058204 A1 | 3/2018 | Clawson et al. .......... E21B 47/14 |
| 2018/0058205 A1* | 3/2018 | Clawson ................... E21B 47/14 |
| 2018/0058206 A1 | 3/2018 | Zhang et al. ............. E21B 47/16 |
| 2018/0058207 A1* | 3/2018 | Song ........................ E21B 47/16 |
| 2018/0058208 A1 | 3/2018 | Song et al. ................ E21B 47/16 |
| 2018/0058209 A1* | 3/2018 | Song ........................ E21B 47/10 |
| 2018/0066490 A1 | 3/2018 | Kjos ........................ E21B 33/035 |
| 2018/0066510 A1 | 3/2018 | Walker et al. ........... E21B 47/011 |
| 2018/0347345 A1* | 12/2018 | Dighe ...................... E21B 17/003 |

FOREIGN PATENT DOCUMENTS

| | | | |
|---|---|---|---|
| EP | 1467060 A1 | 10/2004 | |
| EP | 1409839 | 4/2005 | ......... E21B 43/1185 |
| EP | 2677698 | 12/2013 | ............ H04L 12/28 |
| GB | 2236782 | 4/1991 | |
| WO | WO2002/027139 | 4/2002 | ............. E21B 43/12 |
| WO | WO2010/074766 | 7/2010 | ............... A41C 1/14 |
| WO | WO2013/079928 | 6/2013 | ............. E21B 47/12 |
| WO | WO 2013/079928 A2 | 6/2013 | |
| WO | WO 2013/112273 A2 | 8/2013 | |
| WO | WO2014/018010 | 1/2014 | ............. E21B 47/12 |
| WO | WO 2014/018010 A1 | 1/2014 | |
| WO | WO2014/049360 | 4/2014 | ............. E21B 47/12 |
| WO | WO 2014/049360 A2 | 4/2014 | |
| WO | WO 2014/100264 A1 | 6/2014 | |
| WO | WO2014/100271 | 6/2014 | ............. E21B 47/12 |
| WO | WO 2014/100271 A1 | 6/2014 | |
| WO | WO 2014/100276 A1 | 6/2014 | |
| WO | WO2014/134741 | 9/2014 | ............. E21B 47/13 |
| WO | WO 2014/134741 A1 | 9/2014 | |
| WO | WO2015/117060 | 8/2015 | ............. E21B 47/12 |

OTHER PUBLICATIONS

U.S. Appl. No. 16/139,373, filed Sep. 24, 2018, Yi, Xiaohua et al.

(56) References Cited

OTHER PUBLICATIONS

U.S. Appl. No. 16/139,384, filed Oct. 13, 2017, Disko, Mark M. et al.
U.S. Appl. No. 16/139,394, filed Oct. 13, 2017, Song, Limin et al.
U.S. Appl. No. 16/139,403, filed Oct. 13, 2017, Song, Limin et al.
U.S. Appl. No. 16/139,414, filed Oct. 13, 2017, Zhang, Yibing et al.
U.S. Appl. No. 16/139,421, filed Oct. 13, 2017, Song, Limin et al.
U.S. Appl. No. 16/139,427, filed Oct. 13, 2017, Disko, Mark M. et al.
U.S. Appl. No. 16/175,418, filed Oct. 30, 2018, Kent, David K. et al.
U.S. Appl. No. 62/588,067, filed Nov. 17, 2017, Song, Limin et al.
U.S. Appl. No. 62/588,080, filed Nov. 17, 2017, Kinn, Timothy F. et al.
U.S. Appl. No. 62/588,103, filed Nov. 17, 2017, Yi, Xiaohua et al.
Arroyo, Javier et al. (2009) "Forecasting Histogram Time Series with K-Nearest Neighbours Methods," *International Journal of Forecasting*, v.25, pp. 192-207.
Arroyo, Javier et al. (2011) "Smoothing Methods for Histogram-Valued Time Seriers: An Application to Value-at-Risk," *Univ. of California, Dept. of Economics*, www.wileyonlinelibrary.com, Mar. 8, 2011, 28 pages.
Arroyo, Javier et al. (2011) "Forecasting with Interval and Histogram Data Some Financial Applications," *Univ. of California, Dept. of Economics*, 46 pages.
Emerson Process Management (2011), "Roxar downhole Wireless PT sensor system," www.roxar.com, or downhole@roxar.com, 2 pgs.
Gonzalez-Rivera, Gloria et al. (2012) "Time Series Modeling of Histogram-Valued Data: The Daily Histogram Time Series of S&P500 Intradaily Returns," *International Journal of Forecasting*, v.28, 36 pgs.
Gutierrez-Estevez, M. A. et al. (2013) "Acoustic Boardband Communications Over Deep Drill Strings using Adaptive OFDM", *IEEE Wireless Comm. & Networking Conf.*, pp. 4089-4094.
Qu, X. et al. (2011) "Reconstruction fo Self-Sparse 20 NMR Spectra From undersampled Data In The Indirect Dimension", pp. 8888-8909.
U.S. Department of Defense (1999) "Interoperability and Performance Standards for Medium and High Frequency Radio Systems," *MIL-STD-188-141B*, Mar. 1, 1999, 584 pages.

\* cited by examiner

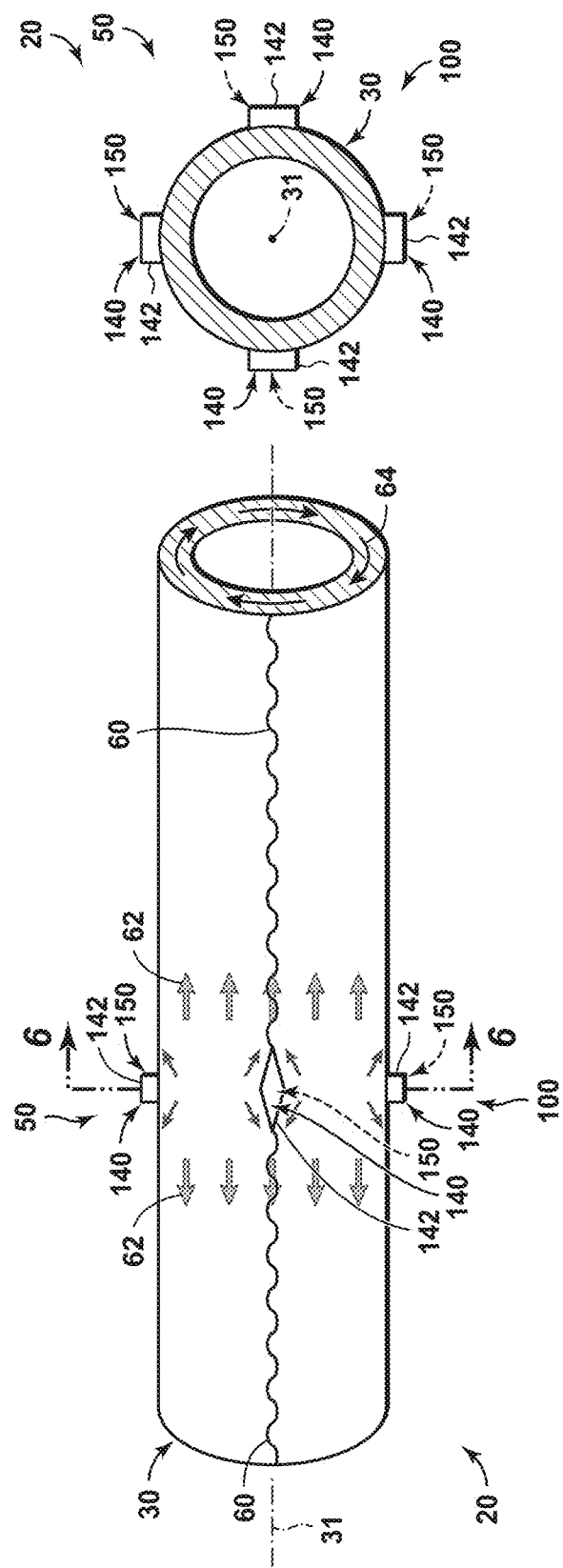

COMMUNICATION NETWORKS, RELAY NODES FOR COMMUNICATION NETWORKS, AND METHODS OF TRANSMITTING DATA AMONG A PLURALITY OF RELAY NODES

CROSS REFERENCE TO RELATED APPLICATIONS

This application claims the benefit of U.S. Provisional Application Ser. No. 62/381,330 filed Aug. 30, 2016, entitled "*Communication Networks, Relay Nodes for Communication Networks, and Methods of Transmitting Data Among a Plurality of Relay Nodes*," U.S. Provisional Application Ser. No. 62/381,335, filed Aug. 30, 2016 entitled "*Zonal Isolation Devices Including Sensing and Wireless Telemetry and Methods of Utilizing the Same*," U.S. Provisional Application Ser. No. 62/428,367, filed Nov. 30, 2016, entitled "*Dual Transducer Communications Node for Downhole Acoustic Wireless Networks and Method Employing Same*," U.S. Provisional Application Ser. No. 62/428,374, filed Nov. 30, 2016, entitled "*Hybrid Downhole Acoustic Wireless Network*," U.S. Provisional Application Ser. No. 62/428,385, filed Nov. 30, 2016 entitled "*Methods of Acoustically Communicating And Wells That Utilize The Methods*," U.S. Provisional Application Ser. No. 62/433,491, filed Dec. 13, 2016 entitled "*Methods of Acoustically Communicating And Wells That Utilize The Methods*," and U.S. Provisional Application Ser. No. 62/428,425 filed Nov. 30, 2016, entitled "*Acoustic Housing for Tubulars*," the disclosures of which are incorporated herein by reference in their entireties.

FIELD OF THE DISCLOSURE

The present disclosure relates generally to communication networks, to relay nodes for the communication networks, and/or to methods of transmitting data among a plurality of relay nodes.

BACKGROUND OF THE DISCLOSURE

It may be beneficial to transmit data along an elongate tubular body, such as a pipeline and/or a drill pipe, without utilizing wires and/or radio frequency (electromagnetic) communications devices. Examples abound where the installation of wires is technically difficult and/or economically impractical. The use of radio transmission also may be impractical, or unavailable, in cases where radio-activated blasting is occurring, and/or where the attenuation of radio waves near the elongate tubular body is significant.

Likewise, it may be desirable to collect and transmit data along the elongate tubular body in a wellbore, such as during a drilling process and/or during production of reservoir fluids via the wellbore. Such data may include temperature, pressure, rate of rock penetration, inclination, azimuth, fluid composition, and/or local geology. In the drilling of oil and gas wells, the wellbore is formed using a drill bit that is urged downwardly at a lower end of a drill string. The drill bit is rotated while force is applied through the drill string and against a rock face of a formation being drilled. In order to obtain desired data, special downhole assemblies have been developed. These downhole assemblies generally are referred to as Logging While Drilling (LWD) and/or Measurement While Drilling (MWD) assemblies.

LWD and MWD assemblies may permit more efficient drilling programs. Particularly, downhole assemblies having LWD and MWD capabilities may store and/or transmit information about subsurface conditions for review by drilling and/or production operators at the surface. LWD and MWD techniques generally seek to reduce the need for tripping the drill string and/or running wireline logs to obtain downhole data.

A variety of technologies have been proposed and/or developed for downhole communications using LWD or MWD. In one form, LWD and MWD information simply may be stored in memory, such as memory associated with a processor utilized in the LWD or MWD process. The memory may be retrieved and the information may be downloaded later when the drill string is pulled, such as when a drill bit is changed out or a new downhole assembly is installed. However, this approach does not permit the information to be utilized during the drilling operation in which the information is obtained, and thus does not enable real-time utilization of the information.

Several real time data telemetry systems also have been proposed. One involves the use of a physical cable, such as an electrical conductor or a fiber optic cable, that is secured to the elongate tubular body. The cable may be secured to an inner and/or to an outer diameter of the elongate tubular body. The cable provides a hardwire connection that allows for real-time transmission of data and the immediate evaluation of subsurface conditions. Further, the cable may permit high data transmission rates and/or the delivery of electrical power directly to downhole sensors.

However, placement of a physical cable along a drill pipe during drilling may be problematic. As an example, the cable may become tangled and/or may break if secured along a rotating drill string. This problem may be lessened when a downhole mud motor is used that allows for a generally non-rotating drill pipe. However, even in this instance, the harsh downhole environment and the considerable force of the pipe as it scrapes across the surrounding borehole may damage the cable.

It has been proposed to place a physical cable along the outside of a casing string during well completion. However, this can be difficult, as placement of wires along the casing string requires that thousands of feet of cable be carefully unspooled and fed during pipe connection and run-in. Further, the use of hard wires in a well completion requires the installation of a specially-designed well head that includes through-openings for the wires. In addition, if the wire runs outside of a casing string, it creates a potential weak spot in a cement sheath that surrounds the casing string. This may contribute to a loss of pressure isolation between subsurface intervals. Furthermore, it generally is not feasible to pass wires through a casing mandrel for subsea applications. In sum, passing cable in the annulus adds significant challenges and cost, both for equipment and for rig time, to well completions.

Mud pulse telemetry, or mud pressure pulse transmission, may be utilized during drilling to obtain real-time data from sensors at, or near, the drill bit. Mud pulse telemetry employs variations in pressure in the drilling mud to transmit signals from the downhole assembly to the surface. The variations in pressure may be sensed and analyzed by a computer at the surface.

A downside to mud pulse telemetry is that it transmits data to the surface at relatively slow rates, typically less than 20 bits per second (bps), and this data rate decreases even further as the length of the wellbore increases. Slow data transmission rates can be costly to the drilling process. For example, the time it takes to downlink instructions and uplink survey data (such as azimuth and inclination), during which the drill string is normally held stationary, can be two to seven minutes. Since many survey stations may be required, this downlink/uplink time can be very expensive, especially on deepwater rigs where daily operational rates can exceed $2 million. Similarly, the time it takes to downlink instructions and uplink data associated with many other tasks, such as setting parameters in a rotary steerable directional drilling tool and/or obtaining a pressure reading from a pore-pressure-while-drilling tool, can be very costly.

Another telemetry system that has been suggested involves electromagnetic (EM) telemetry. EM telemetry employs electromagnetic waves, or alternating current magnetic fields, to "jump" across pipe joints. In practice, a specially-milled drill pipe may be provided that has a conductor wire machined along an inner diameter thereof. The conductor wire transmits signals to an induction coil at the end of the pipe. The induction coil, in turn, transmits an EM signal to another induction coil, which sends that signal through the conductor wire in the next pipe. Thus, each threaded connection provides a pair of specially milled pipe ends for EM communication.

Faster data transmission rates with some level of clarity have been accomplished using EM telemetry; however, it is observed that the induction coils in an EM telemetry system must be precisely located in the box and pin ends of the joints of the drill string to ensure reliable data transfer. For a long (e.g., 20,000 foot) well, there can be more than 600 tool joints. This represents over 600 pipe sections threaded together, and each threaded connection is preferably tested at the drilling platform to ensure proper functioning. Thus, there are economic and functional challenges to effective utilization of EM telemetry systems.

More recently, the use of radiofrequency (RF) signals also has been suggested. While high data transmission rates can be accomplished using RF signals in a downhole environment, the transmission range typically is limited to a few meters. This, in turn, requires the use of numerous repeaters.

Thus, there exists a need for improved communication networks, for improved relay nodes for communication networks, and/or for improved methods of transmitting data among a plurality of relay nodes.

SUMMARY OF THE DISCLOSURE

Communication networks, relay nodes for communication networks, and methods of transmitting data among a plurality of relay nodes utilizing non-dispersive guided acoustic waves are disclosed herein. The methods include inducing a first acoustic wave within an elongate tubular body with a first relay node, conveying the first acoustic wave along the elongate tubular body to a second relay node, and receiving the first acoustic wave with the second relay node. The methods further include inducing a second acoustic wave within the elongate tubular body with the second relay node, conveying the second acoustic wave along the elongate tubular body to a third relay node, and receiving the second acoustic wave with the third relay node.

The communication networks include an elongate tubular body and a wireless data transmission network including a plurality of relay nodes. The plurality of relay nodes includes a first relay node, a second relay node, and a third relay node. The communication network is programmed to transmit data among the first relay node, the second relay node, and the third relay node by performing the methods.

The relay nodes include an electro-acoustic transmitter array and an electro-acoustic receiver. The electro-acoustic transmitter array may include at least 3 electro-acoustic transmitters circumferentially spaced-apart about a perimeter of the elongate tubular body. The electro-acoustic transmitter array is configured to induce a non-dispersive guided acoustic wave within the elongate tubular body.

BRIEF DESCRIPTION OF THE DRAWINGS

FIG. 5 is a less schematic side view illustrating a relay node according to the present disclosure.

FIG. 6 is a less schematic cross-sectional view of the relay node of FIG. 5 taken along line 6-6 of FIG. 5.

DETAILED DESCRIPTION AND BEST MODE OF THE DISCLOSURE

Figure 1:
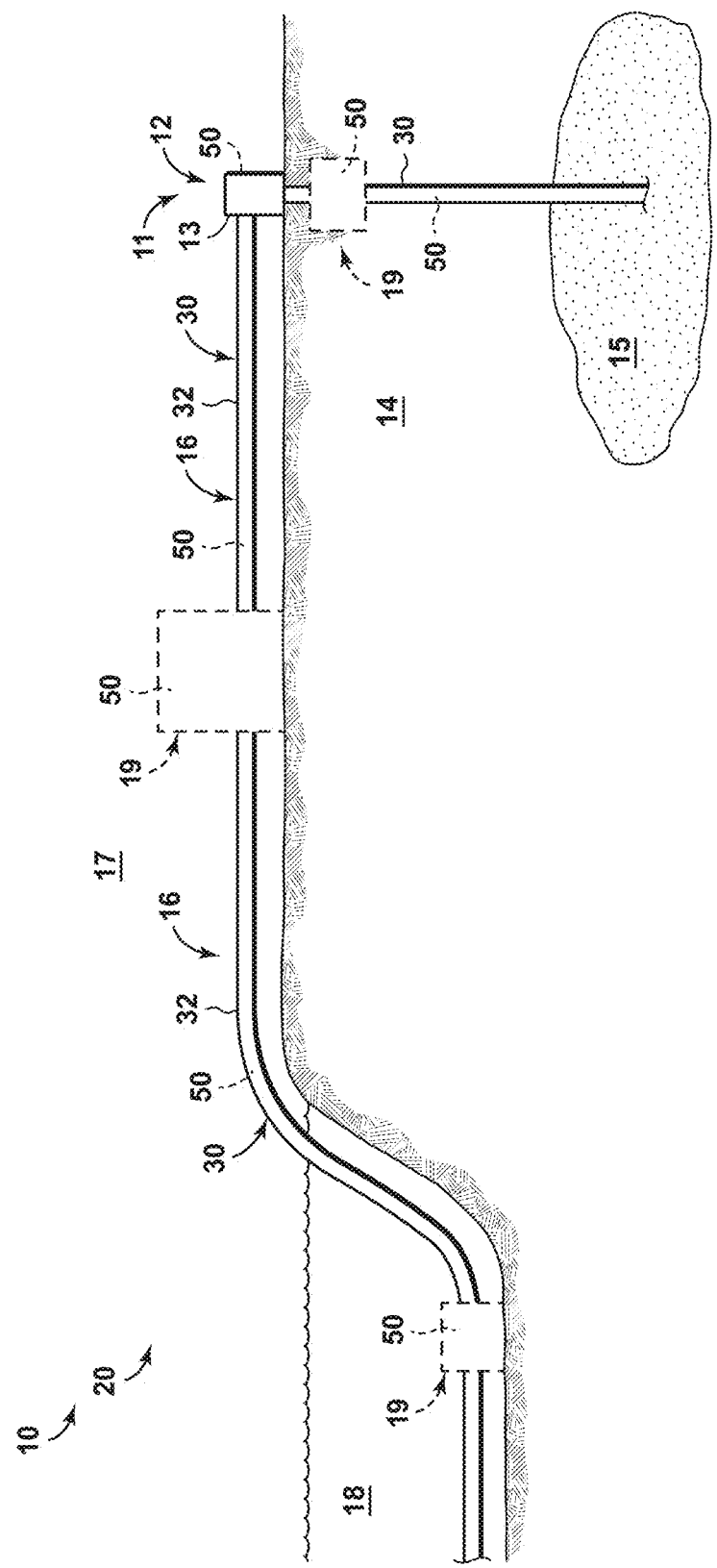
FIG. 1 is a schematic representation of examples of a communication network according to the present disclosure.

FIGS. 1-3 and 5-14 provide examples of communication networks 20, of wireless data transmission networks 50, of relay nodes 100 that may be included in communication networks 20 and/or in wireless data transmission networks 50, and/or of methods 200, according to the present disclosure. Elements that serve a similar, or at least substantially similar, purpose are labeled with like numbers in each of FIGS. 1-3 and 5-14, and these elements may not be discussed in detail herein with reference to each of FIGS. 1-3 and 5-14. Similarly, all elements may not be labeled in each of FIGS. 1-3 and 5-14, but reference numerals associated therewith may be utilized herein for consistency. Elements, components, and/or features that are discussed herein with reference to one or more of FIGS. 1-3 and 5-14 may be included in and/or utilized with any of FIGS. 1-3 and 5-14 without departing from the scope of the present disclosure. In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure.

FIG. 1 is a schematic representation of examples of a communication network 20 according to the present disclosure. Communication network 20 includes an elongate tubular body 30 and a wireless data transmission network 50 that is configured to wirelessly transmit data along a length of the elongate tubular body.

FIG. 1 illustrates that wireless data transmission network 50 may be associated with, may be present in, may be operatively attached to, and/or may be in communication with any suitable portion of elongate tubular body 30. In addition, elongate tubular body 30 may be positioned and/or may extend within and/or through any suitable environment 10.

As illustrated in FIG. 1, wireless data transmission network 50 may be associated with a well 11, such as a hydrocarbon well 12. As an example, the wireless data transmission network may be associated with a surface tree 13 of the well. As another example, the wireless data transmission network may be associated with a portion of elongate tubular body 30 that extends within a subsurface region 14 and/or within a subterranean formation 15, which may include a hydrocarbon.

As also illustrated in FIG. 1, data transmission network 50 may be associated with a fluid transportation infrastructure 16, such as a pipeline 32 that extends within a surface region 17 and/or within an underwater region 18. As also illustrated in FIG. 1, data transmission network 50 may be associated with a vessel 19 that may be in fluid communication with elongate tubular body 30, and vessel 19 may be positioned within subsurface region 14, within surface region 17, and/or within underwater region 18.

Figure 2:
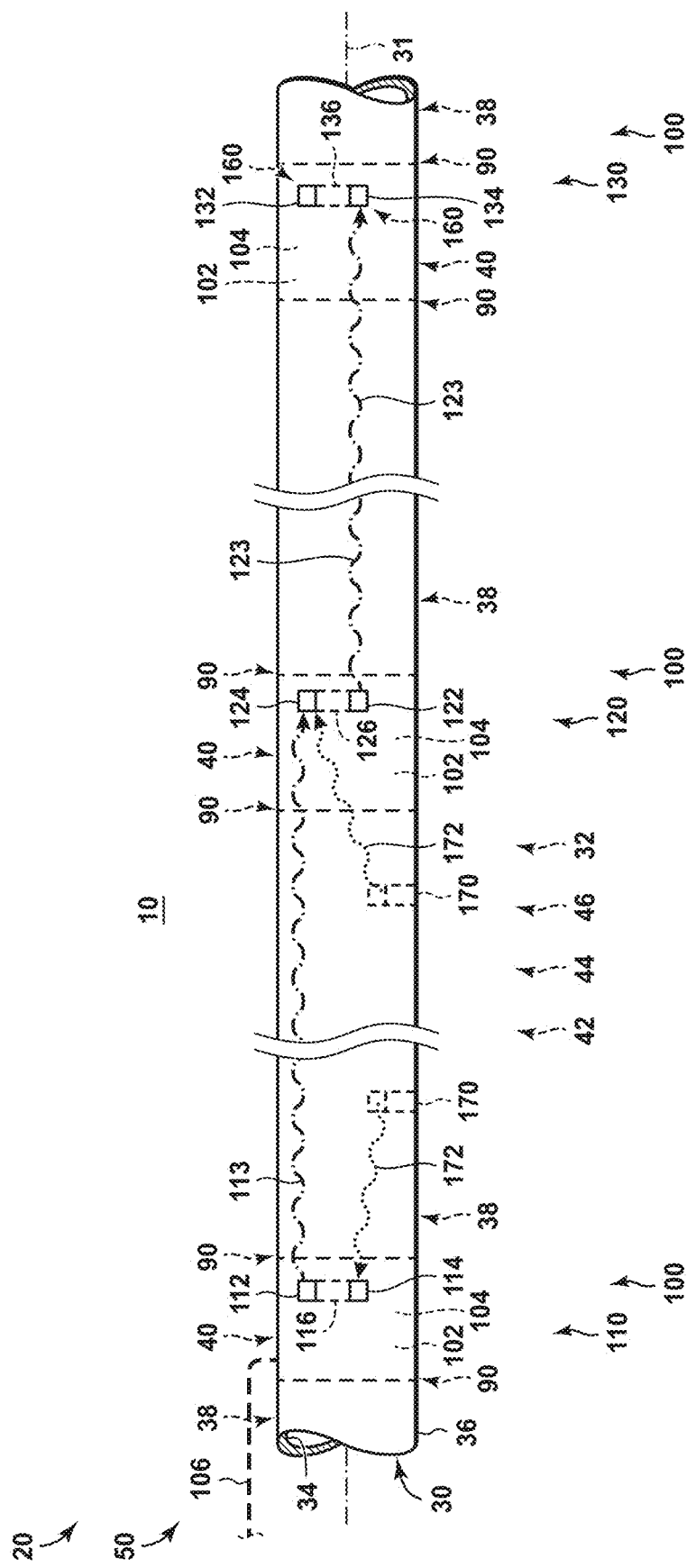
FIG. 2 is a schematic representation of a portion of a communication network, according to the present disclosure.

FIG. 2 is a schematic representation of a communication network 20, according to the present disclosure. Communication network 20 of FIG. 2 may include and/or be communication network 20 of FIG. 1. As such, communication network 20 of FIG. 2 may be positioned at least partially within any suitable environment 10, such as subsurface region 14, surface region 17, and/or underwater region 18, which are illustrated in FIG. 1.

Communication network 20 includes an elongate tubular body 30 and a wireless data transmission network 50. Wireless data transmission network 50 includes a plurality of relay nodes 100 that are spaced apart along a length, or along a longitudinal axis 31, of the elongate tubular body. In the example of FIG. 2, wireless data transmission network 50 includes at least a first relay node 110, a second relay node 120, and a third relay node 130.

First relay node 110 includes a first electro-acoustic transmitter array 112, which is configured to induce a first acoustic wave 113 in and/or within elongate tubular body 30. The first acoustic wave may include, consist of, or consist essentially of a first non-dispersive guided acoustic wave (NDGAW). In addition, first relay node 110 also includes a first electro-acoustic receiver 114.

Second relay node 120 includes a second electro-acoustic transmitter array 122, which is configured to induce a second acoustic wave 123 in and/or within elongate tubular body 30. The second acoustic wave may include, consist of, or consist essentially of a second NDGAW. In addition, second relay node 120 also includes a second electro-acoustic receiver 124, which is configured to receive first acoustic wave 113 from elongate tubular body 30.

Third relay node 130 includes a third electro-acoustic transmitter array 132. In addition, third relay node 130 also includes a third electro-acoustic receiver 134, which is configured to receive second acoustic wave 123 from elongate tubular body 30.

FIG. 2 illustrates a portion of communication network 20 including three relay nodes 100 (e.g., first relay node 110, second relay node 120, and third relay node 130). However, it is within the scope of the present disclosure that the communication network may include any suitable number of relay nodes 100, such as at least 3, at least 5, at least 10, at least 20, at least 30, at least 40, or at least 50 relay nodes spaced apart along the length of elongate tubular body 30.

Under these conditions, relay nodes 100 may be configured to induce a respective induced acoustic wave within the elongate tubular body and/or to receive a respective received acoustic wave from the elongate tubular body. As an example, relay nodes 100 may be configured to receive the respective received acoustic wave, which was induced by a first adjacent relay node on a first side thereof, from the elongate tubular body. In addition, relay nodes 100 also may be configured to induce the respective induced acoustic wave within the elongate tubular body such that the induced acoustic wave is conveyed, via the elongate tubular body, to a second adjacent relay node on a second side thereof. The second side may be opposed to the first side such that relay nodes function as intermediaries for signal transfer, or propagation, between relay nodes that are adjacent thereto.

As illustrated in dashed lines in FIG. 2, communication network 20 further may include one or more sensor nodes 170, which may be spaced apart from relay nodes 100. Sensor nodes 170, when present, may be configured to sense a property related to elongate tubular body 30. In addition, sensor nodes 170 also may be configured to induce, within the elongate tubular body, a sense acoustic wave 172, which may be indicative of, or based upon, the property related to the elongate tubular body. Examples of the sense acoustic wave are disclosed herein. The property related to the elongate tubular body may be sensed within a portion, or region, of the elongate tubular body that is proximal to, or even in contact with, a given sensor node 170.

While not required of all embodiments, a distance, or an average distance, between a given relay node 100 of the plurality of relay nodes 100 and a closest other relay node 100 of the plurality of relay nodes 100 may be greater than an average distance between a given sensor node 170 and a closest one of the plurality of relay nodes 100. Stated another way, one or more sensor nodes 170 may be positioned, along the length of elongate tubular body 30, between adjacent relay nodes 100. As such, a given sensor node 170 may communicate, via a corresponding sense acoustic wave 172, with a corresponding relay node 100 over a shorter communication distance than a communication distance between the corresponding relay node 100 and a closest other relay node 100, and this shorter communication distance may permit and/or facilitate lower-power and/or dispersive-mode communication between the given sensor node and the corresponding relay node.

Sensor nodes 170, when present, may be configured to sense any suitable property that is related to the elongate tubular body. As examples, sensor nodes 170 may detect, quantify, and/or sense one or more of a measure of scale formation within the elongate tubular body, a measure of hydrate formation within the elongate tubular body, a measure of a viscosity of a fluid that extends within and is in contact with the elongate tubular body, a measure of a viscosity of a fluid that is external to and in contact with the elongate tubular body, a measure of a fluid composition of the fluid that extends within and is in contact with the elongate tubular body, a measure of a fluid composition of the fluid that is external to and in contact with the elongate tubular body, and/or a measure of an integrity of the elongate tubular body. Examples of structures that may be included in sensor node 170 include an acoustic transmitter, an acoustic receiver, a temperature detector, a pressure detector, and/or a chemical composition detector.

During operation of communication network 20, data may be transmitted and/or conveyed among relay nodes 100 via corresponding acoustic waves, such as first acoustic wave 113 and/or second acoustic wave 123. This may include transmitting the data in any suitable manner, such as via and/or utilizing methods 200, which are discussed in more detail herein with reference to FIG. 14.

As an example, first electro-acoustic transmitter array 112 of first relay node 110 may induce first acoustic wave 113, which is indicative of, or encoded to represent, the data, within elongate tubular body 30. The first acoustic wave may be conveyed, by the elongate tubular body, to second relay node 120 and then may be received by second electro-acoustic receiver 124 of the second relay node. Responsive to receipt of the first acoustic wave, second electro-acoustic transmitter array 122 of second relay node 120 may induce second acoustic wave 123 within the elongate tubular body, and the second acoustic wave may be based, at least in part, on the first acoustic wave. The second acoustic wave may be conveyed, by the elongate tubular body, to third relay node 130 and then may be received by third electro-acoustic receiver 134 of the third relay node. This process may be repeated any suitable number of times to transmit any suitable data stream along any suitable portion, fraction, and/or region of the length of the elongate tubular body. In addition, this process may be reversed, with data being transmitted from third relay node 130 to second relay node 120 and/or from second relay node 120 to first relay node 110, such as to permit data transmission in both an uphole direction and in a downhole direction within hydrocarbon well 12 of FIG. 1.

In addition, and when communication network 20 includes sensor nodes 170, a given relay node 100 also may receive a given sense acoustic wave 172 from a corresponding sensor node 170. Under these conditions, the given relay node may induce a corresponding acoustic wave, within the elongate tubular body, that is based, at least in part, on the given sense acoustic wave, thereby permitting a data stream, which is transmitted along the length of the elongate tubular body, to include information regarding the property related to the elongate tubular body that is sensed by the sensor node.

Relay nodes 100 may include any suitable structure that may be adapted, configured, designed, and/or constructed to induce corresponding acoustic waves within the elongate tubular body and/or to receive corresponding acoustic waves from the elongate tubular body.

In addition, relay nodes 100 may be powered, or energized, in any suitable manner. As examples, each relay node may include and/or be one or more of a battery-powered relay node that includes a battery 102, a self-powered relay node that includes an electrical energy generator 104, and/or a wire-powered relay node that is attached to a power cable 106.

Figure 8:
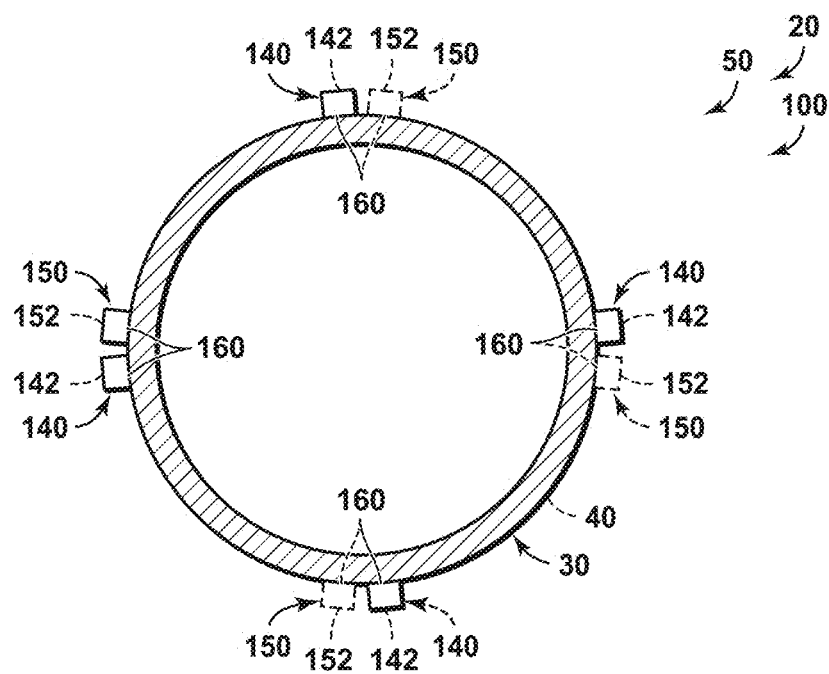
FIG. 8 is a schematic cross-sectional view of the relay node of FIG. 7 taken along line 8-8 of FIG. 7.

It is within the scope of the present disclosure that relay nodes 100 may be incorporated into communication network 20 in any suitable manner. As an example, one or more of the relay nodes may be directly and/or operatively attached to elongate tubular body 30 via an attachment structure 160, which is illustrated in FIGS. 2 and 8. Examples of attachment structure 160 include any suitable glue, weld, braze, fastener, spring, and/or clamp.

It is also within the scope of the present disclosure that relay nodes 100 may be operatively attached to any suitable portion of elongate tubular body 30. As examples, one or more relay nodes 100, or portions thereof, may be operatively attached to an internal surface 34 of the elongate tubular body, may be operatively attached to an external surface 36 of the elongate tubular body, and/or may extend, at least partially, within the elongate tubular body, as discussed in more detail herein with reference to FIG. 8. As another example, the elongate tubular body may include a plurality of tubular segments 38 and a plurality of couplings 40, with each tubular segment being operatively attached to an adjacent tubular segment by a respective coupling. Under these conditions, relay nodes 100 may be operatively attached to, or integral with, tubular segments 38 and/or couplings 40.

As illustrated in dashed lines in FIG. 2, relay nodes 100, such as first relay node 110, second relay node 120, and/or third relay node 130, may include corresponding controllers, such as a first controller 116, a second controller 126, and/or a third controller 136, respectively. Under these conditions, the controllers may be programmed to control the operation of the relay nodes, such as via performing any suitable portion of methods 200 that are discussed herein with reference to FIG. 14.

First electro-acoustic transmitter array 112, second electro-acoustic transmitter array 122, and third electro-acoustic transmitter array 132 collectively may be referred to herein as electro-acoustic transmitter arrays. As discussed in more detail herein with reference to FIGS. 5-10, each electro-acoustic transmitter array may be configured to induce a respective acoustic wave at a plurality of locations about a perimeter of elongate tubular body 30. Such a configuration may permit the electro-acoustic transmitter arrays to induce NDGAWs, such as longitudinal acoustic waves, L(0,2) acoustic waves, in-plane torsional shear acoustic waves, and/or T(0,1) acoustic waves, within the elongate tubular body. NDGAWs may be non-dispersive in nature and may propagate over a longer distance, or along a greater length of the elongate tubular body, when compared to dispersive acoustic waves, such as compressive waves.

It is within the scope of the present disclosure that each electro-acoustic transmitter array may include and/or may be defined by any suitable structure. As an example, each electro-acoustic transmitter array may include at least 2, at least 3, at least 4, at least 5, at least 6, at least 8, at least 10, at least 12, at least 18, or at least 36 electro-acoustic transmitters. The number of electro-acoustic transmitters in a given electro-acoustic transmitter array may be selected based upon any suitable criteria, examples of which include a material of construction of the elongate tubular body, a diameter of the elongate tubular body, a wall thickness of the elongate tubular body, a composition of a fluid that extends within a fluid conduit defined by the elongate tubular body, and/or a composition of a material that extends in contact with an external surface of the elongate tubular body. The electro-acoustic transmitters in a given electro-acoustic transmitter array may be circumferentially spaced apart, or equally spaced apart, about the perimeter of the elongate tubular body.

Figure 9:
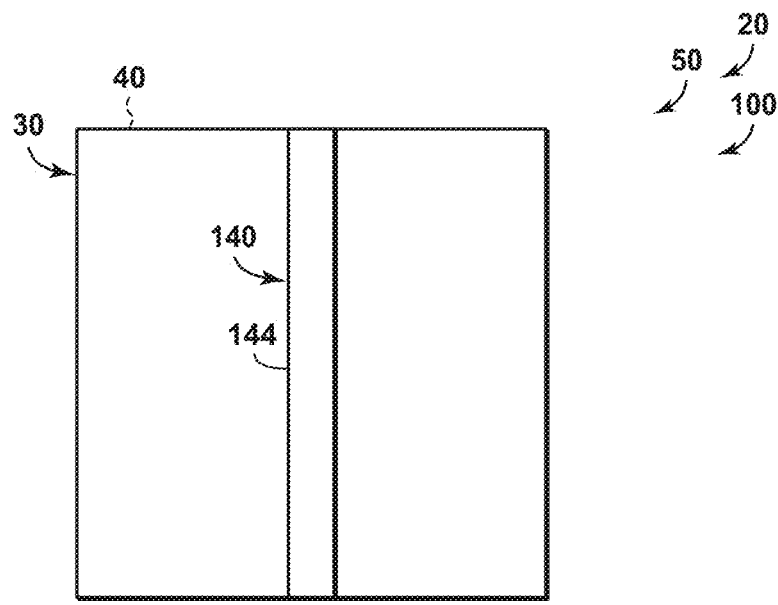
FIG. 9 is a schematic side view illustrating a relay node according to the present disclosure.

As another example, each electro-acoustic transmitter array may include a transducer ring that circumferentially extends about the perimeter of the elongate tubular body, as illustrated in FIG. 9 and discussed in more detail herein with reference thereto. Regardless of the exact construction, and as discussed, the electro-acoustic transmitter arrays disclosed herein are configured to induce a corresponding acoustic wave at a plurality of locations about the circumference of the elongate tubular body.

First electro-acoustic receiver 114, second electro-acoustic receiver 124, and/or third electro-acoustic receiver 134 collectively may be referred to herein as electro-acoustic receivers. It is within the scope of the present disclosure that each electro-acoustic receiver may be configured to receive any suitable corresponding acoustic wave. As examples, second electro-acoustic receiver 124 may be configured to receive the first NDGAW from first electro-acoustic transmitter array 112, and third electro-acoustic receiver 134 may be configured to receive the second NDGAW from second electro-acoustic transmitter array 122. As another example, it is within the scope of the present disclosure that elongate tubular body 30 may include one or more reflection points 90, an example of which is an interface region between a given tubular segment 38 and a corresponding coupling 40. Under these conditions, acoustic waves, which are conveyed by elongate tubular body 30, may be reflected at reflection points 90 thereby generating a reflected acoustic wave. With this in mind, second electro-acoustic receiver 124 additionally may be configured to receive a first reflected acoustic wave from the elongate tubular body and/or from a first reflection point, and third electro-acoustic receiver 134 may be configured to receive a second reflected acoustic wave from the elongate tubular body and/or from a second reflection point.

Figure 7:
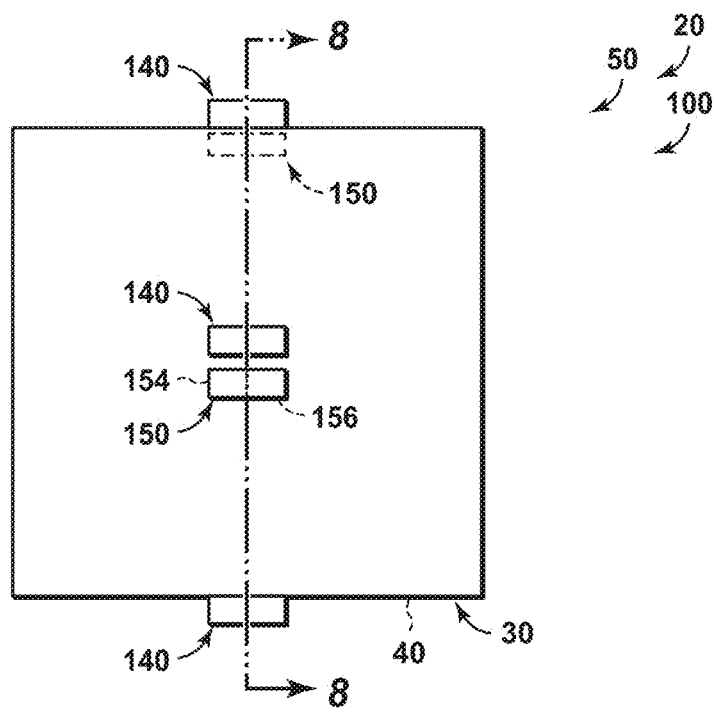
FIG. 7 is a schematic side view illustrating relay nodes according to the present disclosure.

It is within the scope of the present disclosure that first electro-acoustic receiver 114, second electro-acoustic receiver 124, and/or third electro-acoustic receiver 134 may be, or may be referred to herein as, an electro-acoustic receiver array that includes a plurality of individual electro-acoustic receivers circumferentially spaced apart, or equally spaced apart, about the perimeter of the elongate tubular body. This is illustrated in FIGS. 7-8 and discussed in more detail herein with reference thereto. When communication network 20 includes an electro-acoustic receiver array, the electro-acoustic receiver array may include any suitable number of individual electro-acoustic receivers. As examples, the electro-acoustic receiver array may include at least 2, at least 3, at least 4, at least 5, at least 6, at least 8, at least 10, at least 12, at least 18, or at least 36 electro-acoustic receivers.

Electro-acoustic transmitter arrays and/or electro-acoustic receivers disclosed herein may include and/or may be defined by any suitable structure. As examples, each electro-acoustic transmitter array may include one or more piezoelectric transmitter stacks and/or one or more electromagnetic acoustic transmitters. As additional examples, each electro-acoustic receiver may include one or more piezoelectric receiver stacks and/or one or more electromagnetic acoustic receivers.

Figure 3:
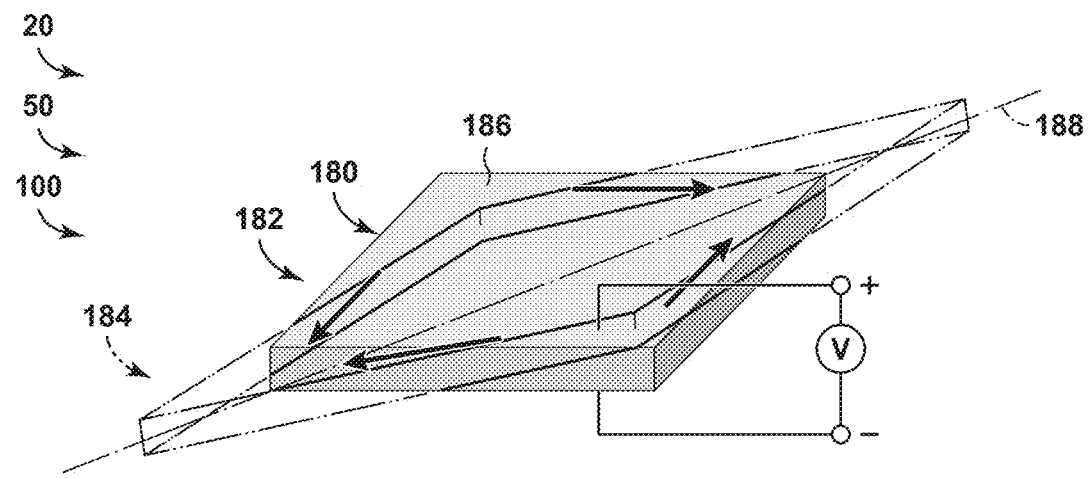
FIG. 3 is a less schematic example of piezoelectric stack that may be included in and/or utilized with the communication networks, relay nodes, and methods according to the present disclosure.

An example of a piezoelectric element 180, which may be utilized in the piezoelectric transmitter stacks and/or in the piezoelectric receiver stacks disclosed herein, is illustrated in FIG. 3. Piezoelectric element 180 may include and/or be an in-plane shear piezoelectric transducer that is configured to transition from an unexcited conformation 182, as illustrated in solid lines in FIG. 3, to an excited conformation 184, as illustrated in dash-dot-dot lines in FIG. 3, responsive to application of an excitation voltage, V, thereto. As also illustrated, this transition occurs within an excitation plane 186 and along an excitation axis 188. Thus, in-plane shear piezoelectric transducers may be utilized to produce directionally oriented acoustic waves, such as NDGAWs, within an elongate tubular body, such as elongate tubular body 30 of FIGS. 1-2.

It is within the scope of the present disclosure that a single element and/or device may define a given electro-acoustic transmitter array and a corresponding electro-acoustic receiver of a given relay node 100. Alternatively, it also is within the scope of the present disclosure that separate and/or distinct elements may define the given electro-acoustic transmitter array and the corresponding electro-acoustic receiver of the given relay node 100. Under these conditions, and with reference to FIG. 2, at least a portion, or even an entirety, of first electro-acoustic transmitter array 112 may be spaced apart and/or distinct from first electro-acoustic receiver 114. Additionally or alternatively, at least a portion, or even an entirety, of second electro-acoustic transmitter array 122 may be spaced apart and/or distinct from second electro-acoustic receiver 124. Similarly, at least a portion, or even an entirety, of third electro-acoustic transmitter array 132 may be spaced apart and/or distinct from third electro-acoustic receiver 134.

With continued reference to FIG. 2, relay nodes 100, such as first relay node 110, second relay node 120, and/or third relay node 130, are spaced apart from one another along the length, or longitudinal axis 31, of elongate tubular body 30. Thus, relay nodes 100 also may be referred to herein as spaced-apart relay nodes 100, and it is within the scope of the present disclosure that an average spacing, or distance, between adjacent relay nodes 100 may have any suitable value. As examples, the average distance between adjacent relay nodes may be at least 1 meter (m), at least 2.5 m, at least 5 m, at least 7.5 m, at least 10 m, at least 12.5 m, at least 15 m, at least 20 m, at least 25 m, at least 30 m, at least 40 m, at least 50 m, or at least 60 m. Additionally or alternatively, the average distance between adjacent relay nodes may be at most 100 m, at most 90 m, at most 80 m, at most 70 m, at most 60 m, at most 50 m, at most 40 m, at most 30 m, at most 25 m, at most 20 m, or at most 15 m.

Elongate tubular body 30 may include any suitable structure within which acoustic waves may be induced and/or conveyed. As an example, elongate tubular body 30 may include and/or be a metallic elongate tubular body. As additional examples, elongate tubular body 30 additionally or alternatively may include and/or be a pipeline 32, a drill string 42, a casing string 44, and/or production tubing 46. Stated another way, and as discussed in more detail herein with reference to FIG. 1, elongate tubular body 30 may be included in and/or may form a portion of a well 11, a hydrocarbon well 12, production tubing 46 for hydrocarbon well 12, casing string 44 for hydrocarbon well 12, pipeline 32, a hydrocarbon pipeline 32, and/or vessel 19. In addition, and as also discussed herein with reference to FIG. 1, elongate tubular body 30 and any suitable portion of wireless data transmission network 50 that is associated therewith may extend at least partially, or even completely, within subsurface region 14, may extend at least partially, or even completely, under water, or in underwater region 18, and/or may extend at least partially, or even completely, above ground, or in surface region 17.

Figure 4:
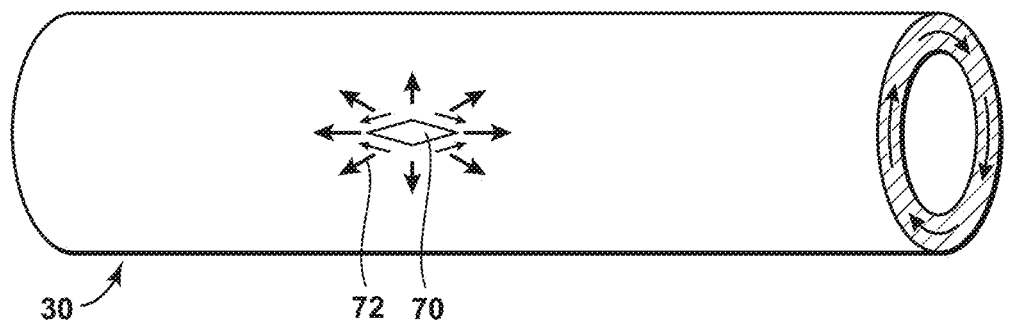
FIG. 4 is a less schematic example of a prior art relay node.

As discussed, the communication networks, relay nodes, and methods according to the present disclosure may utilize electro-acoustic transmitter arrays to induce non-dispersive guided acoustic waves (NDGAW) within the elongate tubular body. Such NDGAWs may be aligned with the elongate axis of the elongate tubular body and/or may be directional in nature. In order to induce such NDGAWs, and as also discussed, each electro-acoustic transmitter array may induce the NDGAW at a plurality of locations about the circumference of the elongate tubular body. Such a configuration, which is illustrated in FIGS. 5-10 and discussed in more detail herein with reference thereto, may be in contrast to prior art relay nodes 70, an example of which is illustrated in FIG. 4. Such prior art relay nodes utilize a single electro-acoustic transmitter to generate a non-directional acoustic wave 72 at a single location. Such non-directional acoustic waves dissipate more quickly, or over a shorter distance, when compared to the NDGAWs that are generated by electro-acoustic transmitter arrays according to the present disclosure.

FIGS. 5-10 illustrate examples of relay nodes 100 according to the present disclosure. Relay nodes 100 of FIGS. 5-10 may form a portion of a wireless data transmission network 50 and/or a communication network 20 and may be, may be similar to, or may be identical to, relay nodes 100 of FIGS. 1-2. With this in mind, any of the structures, functions, and/or features discussed herein with reference to relay nodes 100 of FIGS. 5-10 may be included in and/or utilized with communication networks 20, wireless data transmission networks 50, and/or relay nodes 100 of FIGS. 1-2 without departing from the scope of the present disclosure. Similarly, any of the structures, functions, and/or features discussed herein with reference to communication networks 20, wireless data transmission networks 50, and/or relay nodes 100 of FIGS. 1-2 may be included in and/or utilized with relay nodes 100 of FIGS. 5-10 without departing from the scope of the present disclosure. In addition, any of the structures, functions, and/or features, which are illustrated and/or disclosed herein with reference to any relay node 100 of any one of FIGS. 5-10, may be include in and/or utilized with any other relay node 100 of any one of FIGS. 5-10 without departing from the scope of the present disclosure.

FIG. 5 is a less schematic side view illustrating a relay node 100 according to the present disclosure, while FIG. 6 is a less schematic cross-sectional view of the relay node of FIG. 5 taken along line 6-6 of FIG. 5. Relay node 100 of FIGS. 5-6 is operatively attached to an elongate tubular body 30 and includes a plurality of electro-acoustic transmitters 140 circumferentially spaced apart, or equally spaced apart, about a perimeter of elongate tubular body 30. Electro-acoustic transmitters 140 may include and/or be any suitable structure, examples of which include a piezoelectric transmitter stack 142, an in-plane shear d36-type PMNT piezoelectric wafer, and/or an electromagnetic acoustic transmitter. When electro-acoustic transmitters 140 include piezoelectric transmitter stacks 142, the piezoelectric transmitter stack may include any suitable number of stacked piezoelectric transmitter wafers, including at least 2, at least 3, at least 4, or at least 5 stacked piezoelectric transmitter wafers. Electro-acoustic transmitters 140 are configured to induce a transmitted acoustic wave, in the form of a non-dispersive guided acoustic wave (NDGAW), within elongate tubular body 30.

In the example of FIGS. 5-6, at least one, and optionally all, electro-acoustic transmitters 140 also function as electro-acoustic receivers 150. As such, relay node 100 of FIGS. 5-6 also may be referred to herein as including both an electro-acoustic transmitter array and an electro-acoustic receiver array. Relay node 100 illustrated in FIGS. 5-6 includes four electro-acoustic transmitters 140 and up to four electro-acoustic receivers 150; however, this is not required, and relay node 100 may include any suitable number of electro-acoustic transmitters 140, examples of which are disclosed herein.

The individual electro-acoustic transmitters 140 within relay node 100 are oriented, relative to one another, such that relay node 100 is configured to induce the NDGAW within elongate tubular body 30. This NDGAW may include, consist of, consist essentially of, or be a torsional shear wave 60 that propagates along, or parallel to, a propagation axis 62 that is parallel to longitudinal axis 31 of the elongate tubular body and that vibrates along, or parallel to, a vibration axis 64 that is perpendicular to, or rotates about, the longitudinal axis of the elongate tubular body.

FIG. 7 is a schematic side view illustrating additional relay nodes 100 according to the present disclosure, while FIG. 8 is a schematic cross-sectional view of the relay nodes of FIG. 7 taken along line 8-8 of FIG. 7. Relay nodes 100 of FIGS. 7-8 include an electro-acoustic transmitter array including a plurality of electro-acoustic transmitters 140 circumferentially spaced apart about a perimeter of an elongate tubular body 30. In addition, relay nodes 100 of FIGS. 7-8 also include at least one electro-acoustic receiver 150 and optionally a plurality of circumferentially spaced-apart electro-acoustic receivers 150, as illustrated in dashed lines. The electro-acoustic transmitter array is configured to induce a transmitted acoustic wave, in the form of a NDGAW, within the elongate tubular body, and the at least one electro-acoustic receiver is configured to receive a received acoustic wave from the elongate tubular body.

Similar to FIGS. 5-6, electro-acoustic transmitters 140 of FIGS. 7-8 may include and/or be any suitable structure, examples of which are discussed herein with reference to FIGS. 5-6. Also similar to FIGS. 5-6, relay nodes 100 may include any suitable number of electro-acoustic transmitters 140, and electro-acoustic transmitters 140 may be configured to induce a transmitted acoustic wave, in the form of a NDGAW, within an elongate tubular body 30 to which the electro-acoustic transmitters are attached.

In the embodiment of FIGS. 7-8, the at least one electro-acoustic receiver 150 is distinct and/or spaced apart from the plurality of electro-acoustic transmitters 140. Such a configuration may permit one or more properties and/or characteristics of electro-acoustic transmitters 140 to be selected and/or optimized for acoustic wave generation within elongate tubular body 30, while one or more properties and/or characteristics of electro-acoustic receiver 150 may be selected and/or optimized for receipt of acoustic waves from elongate tubular body 30. The at least one electro-acoustic receiver may include any suitable structure. As an example, the electro-acoustic receiver may include, or be, a piezoelectric receiver stack 152. The piezoelectric receiver stack may include at least 2, at least 3, at least 4, or at least 5 stacked piezoelectric receiver wafers. As another example, the electro-acoustic receiver may include, or be, an electromagnetic acoustic receiver. Regardless of the exact configuration, the at least one electro-acoustic receiver 150 may be configured to receive the received acoustic wave from elongate tubular body 30.

As discussed herein with reference to FIG. 2, elongate tubular body 30 may include a reflection point 90, and reflection point 90 may reflect the transmitted acoustic wave. As such, the received acoustic wave may be different from, or have a different mode than, the transmitted acoustic wave. Under these conditions, the received acoustic wave also may be referred to herein as a reflected acoustic wave, and electro-acoustic receiver 150 may be configured to receive the reflected acoustic wave. As an example, reflection point 90 may convert at least a portion of the NDGAW, which comprises the transmitted acoustic wave, into a compressive acoustic wave, which comprises the reflected acoustic wave. Under these conditions, electro-acoustic receiver 150 may include both a reflected acoustic wave receiver 154 and a NDGAW receiver 156, as illustrated in FIG. 7. Reflected acoustic wave receiver 154 may be different from, structurally different from, spaced apart from, and/or not coextensive with NDGAW receiver 156. The reflected acoustic wave also may include one or more of a high-order torsional acoustic wave, such as a T(0,2) acoustic wave, a longitudinal acoustic wave, such as an L(0,1) acoustic wave, and/or a flexural acoustic wave, and the electro-acoustic receiver may be configured to receive any, or even all, of these acoustic waves.

It is within the scope of the present disclosure that relay node 100 of FIGS. 5-8 may include and/or may be operatively attached to at least a portion of elongate tubular body 30, such as to a coupling 40. Under these conditions, electro-acoustic transmitters 140 of the electro-acoustic transmitter array and also the one or more electro-acoustic receivers 150 may be operatively attached to the portion of the elongate tubular body, such as via an attachment structure 160. Examples of attachment structure 160 are disclosed herein.

FIG. 9 is another schematic side view illustrating another relay node 100 according to the present disclosure. Relay node 100 of FIG. 9 includes an electro-acoustic transmitter 140 in the form of a ring 144 that may be operatively attached to, and extends circumferentially about, an elongate tubular body 30. Similar to the plurality of separate, distinct, and/or spaced-apart electro-acoustic transmitters 140 of FIGS. 5-8, ring 144 of FIG. 9 may be configured to induce a transmitted acoustic wave within elongate tubular body 30 at a plurality of locations around the circumference of the elongate tubular body and/or continuously within a line that extends around the elongate tubular body. Ring 144 may include and/or be defined by any suitable structure, examples of which are disclosed herein with reference to electro-acoustic transmitters 140 of FIGS. 5-8.

Figure 10:
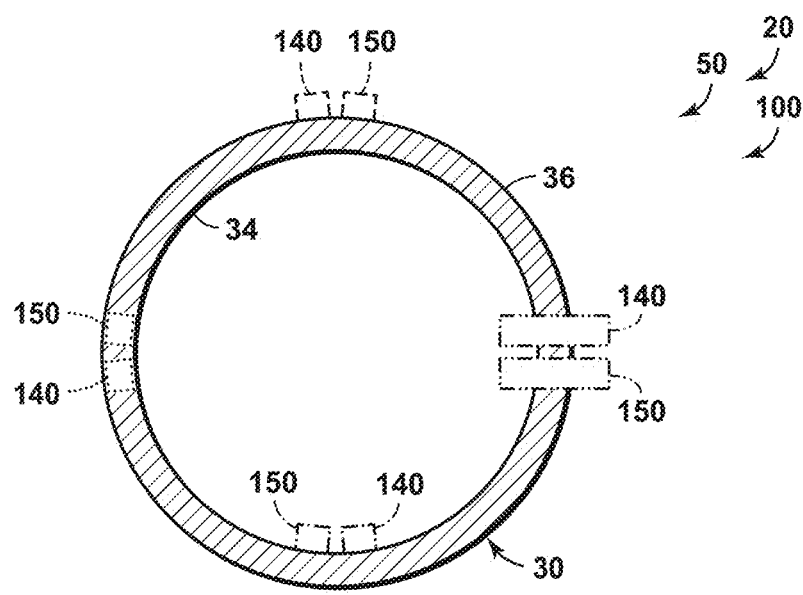
FIG. 10 is a schematic cross-sectional view illustrating relay nodes according to the present disclosure.

FIG. 10 is a schematic cross-sectional view illustrating relay nodes 100 according to the present disclosure. FIG. 10 illustrates that electro-acoustic transmitters 140 and/or electro-acoustic receivers 150 of relay nodes 100 may be operatively attached to elongate tubular body 30 and/or incorporated into communication network 20 in any suitable manner. As an example, and as illustrated in dashed lines in FIG. 10, electro-acoustic transmitters 140 and/or electro-acoustic receivers 150 may be operatively attached to an external surface 36 of elongate tubular body 30. As another example, and as illustrated in dash-dot lines in FIG. 10, electro-acoustic transmitters 140 and/or electro-acoustic receivers 150 may be operatively attached to an internal surface 34 of elongate tubular body 30. As yet another example, and as illustrated in dash-dot-dot lines in FIG. 10, electro-acoustic transmitters 140 and/or electro-acoustic receivers 150 may extend through elongate tubular body 30 and/or may extend between external surface 36 and internal surface 34. As another example, and as illustrated in dotted lines in FIG. 10, electro-acoustic transmitters 140 and/or electro-acoustic receivers 150 may be positioned at least partially within and/or may be encapsulated within elongate tubular body 30.

Figure 11:
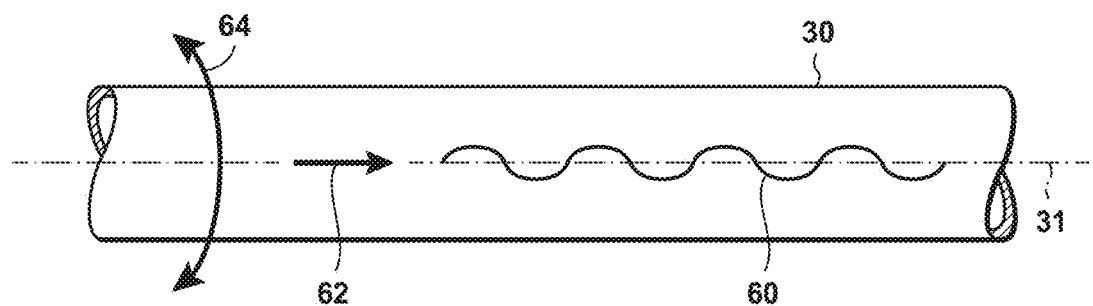
FIG. 11 is a schematic illustration of an in-plane torsional shear acoustic wave that may be utilized with the communication networks, relay nodes, and methods according to the present disclosure.
Figure 12:
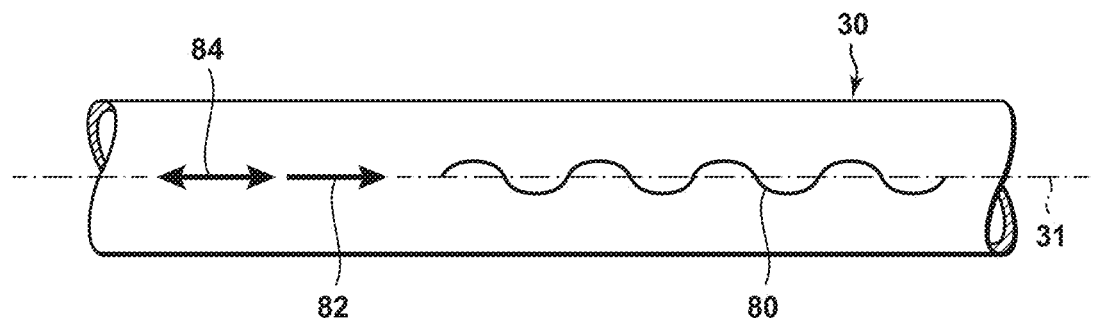
FIG. 12 is a schematic illustration of a compressive wave that may be utilized with the communication networks, relay nodes, and methods according to the present disclosure.

FIG. 11 is a schematic illustration of an in-plane torsional shear acoustic wave 60 that may be utilized with the communication networks, relay nodes, and methods according to the present disclosure, and FIG. 12 is a schematic illustration of a compressive wave 80 that may be utilized with the communication networks, relay nodes, and methods according to the present disclosure. As illustrated in FIG. 11, in-plane torsional shear acoustic waves 60 may propagate along, or parallel to, a propagation axis 62 that is parallel, or at least substantially parallel, to a longitudinal axis 31 of elongate tubular body 30. In addition, the in-plane torsional shear acoustic wave also may cause vibration of a material that comprises elongate tubular body 30 along, or parallel to, a vibration axis 64 that is perpendicular, or at least substantially perpendicular, to longitudinal axis 31 and/or that rotates around the longitudinal axis. Longitudinal axis 31 also may be referred to herein as an elongate axis 31.

Compressive waves 80, which are illustrated in FIG. 12, also may propagate along, or parallel to, a propagation axis 82 that is parallel, or at least substantially parallel, to longitudinal axis 31 of elongate tubular body 30. However, the compressive waves cause vibration of the material that comprises the elongate tubular body along, or parallel to, a vibration axis 84 that is parallel, or at least substantially parallel, to the longitudinal axis.

Figure 13:
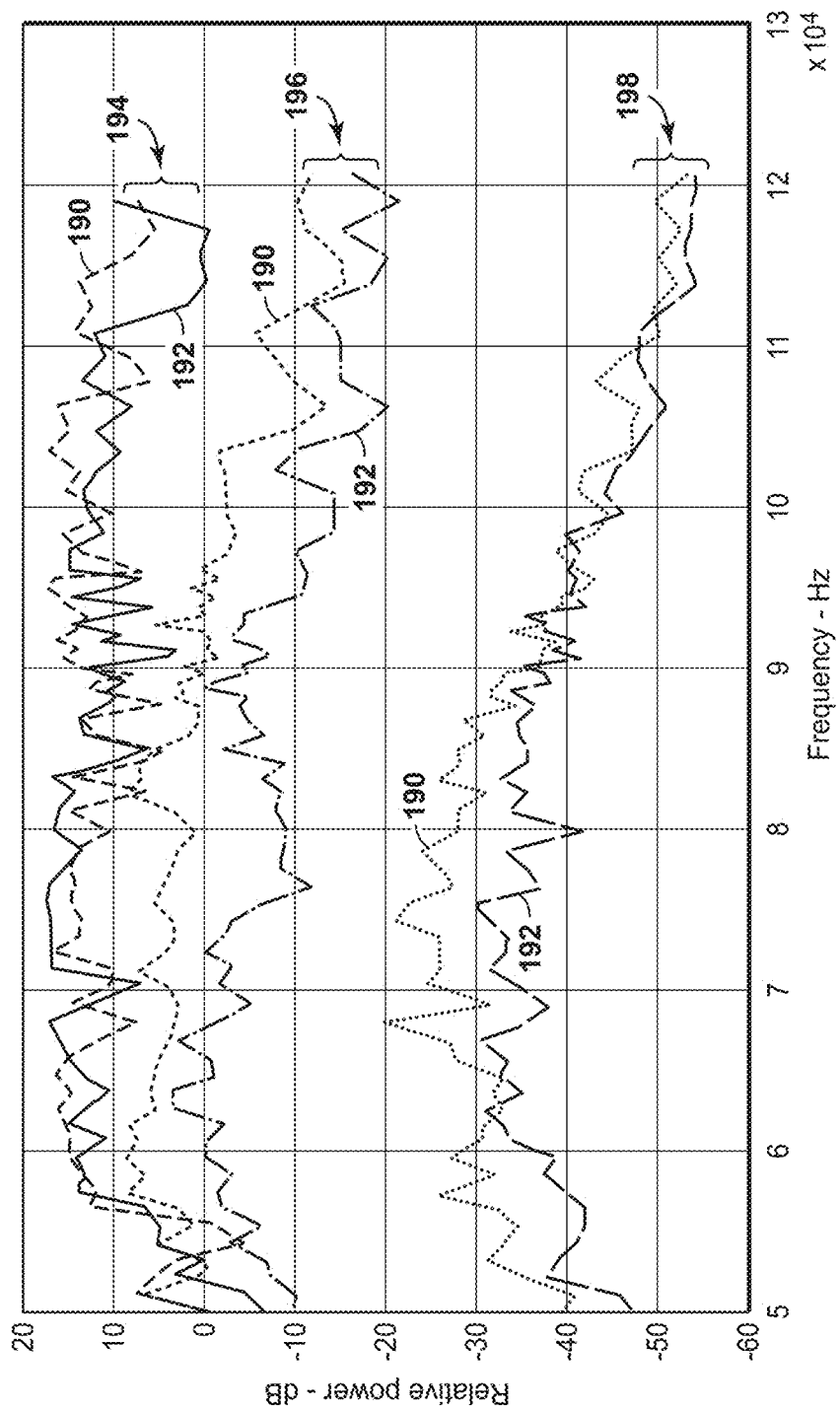
FIG. 13 is a plot comparing propagation of shear acoustic waves and compressive acoustic waves along a length of an elongate tubular body.

The communication networks, relay nodes, and methods disclosed herein preferentially transmit, induce, and/or utilize non-dispersive guided acoustic waves (NDGAW), such as in-plane torsional shear acoustic waves 60 that are illustrated in FIG. 11, for communication between adjacent relay nodes. Such waves are non-dispersive in nature and thus propagate over a longer distance than dispersive waves, such as compressive waves 80 that are illustrated in FIG. 12. This is illustrated in FIG. 13, which is a plot comparing propagation of in-plane torsional shear acoustic waves 190 and compressive acoustic waves 192 along a length of an elongate tubular body. FIG. 13 plots relative power of in-plane torsional shear acoustic waves 190 and compressive acoustic waves 192 as a function of frequency for three different distances from a transmitter, 3 feet (indicated at 194), 95 feet (indicated at 196), and 295 feet (indicated at 198). As may be seen from FIG. 13, in-plane torsional shear acoustic waves 190 generally exhibit a higher relative power at a given distance from the transmitter and over a wide portion of the plotted frequency range when compared to compressive acoustic waves 192.

While the communication networks, relay nodes, and methods disclosed herein preferentially utilize NDGAWs, these communication networks, relay nodes, and methods also recognize that NDGAWs may be converted into dispersive waves by the transmission medium, such as by reflection points 90 within elongate tubular body 30, which are illustrated in FIG. 2 and discussed herein with reference thereto. Thus, the electro-acoustic receivers disclosed herein may include both reflected acoustic wave receivers 154 and NDGAW receivers 156, as illustrated in FIG. 7 and discussed herein with reference thereto. Such a configuration may provide increased flexibility and/or improved detection of acoustic waves that are transmitted within elongate tubular body 30 of FIGS. 1-12. Additionally or alternatively, such a configuration also may permit sensor nodes 170 of FIG. 2 to communicate with relay nodes 100 via dispersive acoustic waves, such as compressive wave 80 of FIG. 12.

Figure 14:
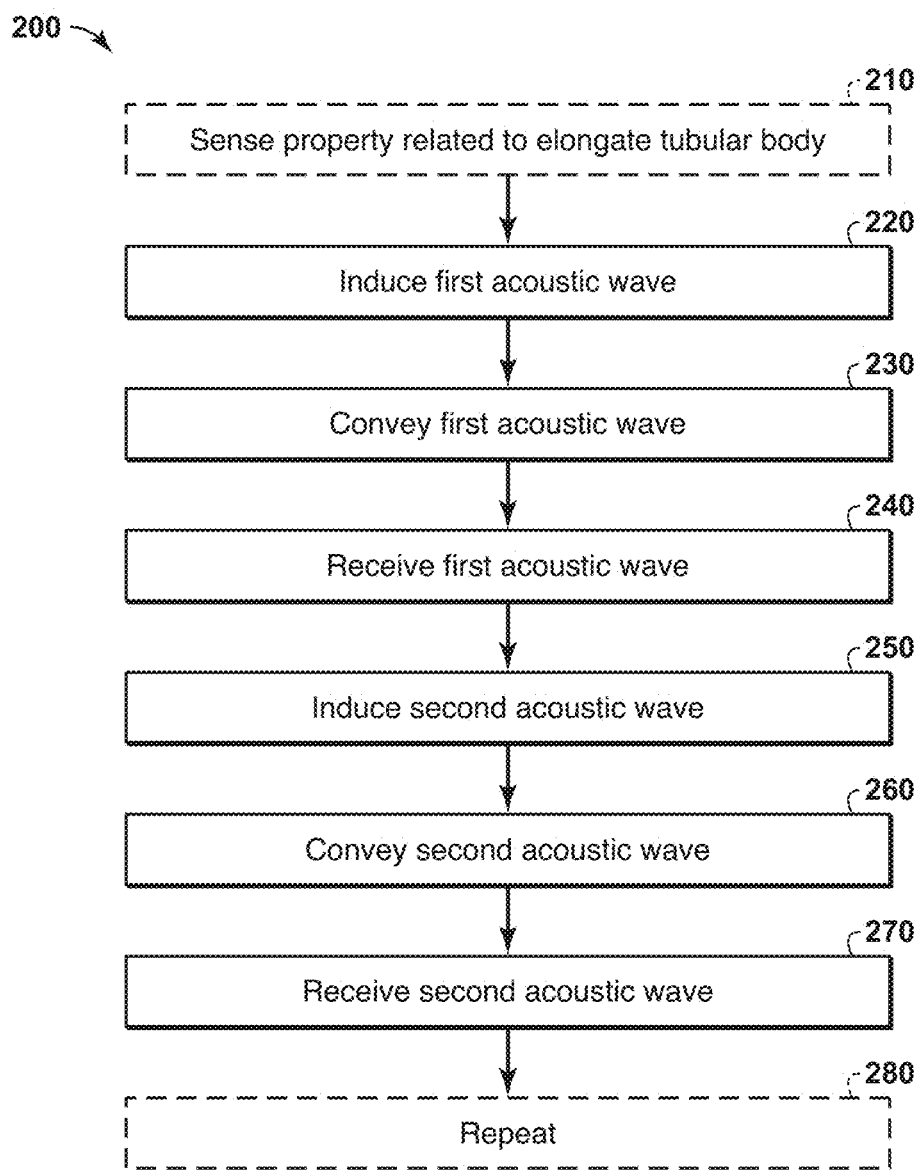
FIG. 14 is a flowchart depicting methods, according to the present disclosure, of transmitting data among a plurality of relay nodes spaced apart along an elongate tubular body.

FIG. 14 is a flowchart depicting methods 200, according to the present disclosure, of transmitting data among a plurality of relay nodes spaced apart along an elongate tubular body. Methods 200 may be utilized to transmit the data in any suitable direction and/or along any suitable elongate tubular body, examples of which are disclosed herein. As an example, and as illustrated in FIG. 1, methods 200 may be utilized to transmit the data from subterranean formation 15 to surface region 17, from surface region 17 to subterranean formation 15, within surface region 17, from surface region 17 to underwater region 18, and/or from underwater region 18 to surface region 17.

Methods 200 may include sensing a property related to the elongate tubular body at 210 and include inducing a first acoustic wave at 220, conveying the first acoustic wave at 230, and receiving the first acoustic wave at 240. Methods 200 also include inducing a second acoustic wave at 250, conveying the second acoustic wave at 260, and receiving the second acoustic wave at 270. Methods 200 also may include repeating at least a portion of the methods at 280.

Sensing the property related to the elongate tubular body at 210 may include sensing any suitable property that is related to the elongate tubular body in any suitable manner. As an example, the sensing at 210 may include sensing with a sensor node, such as sensor node 170 of FIG. 2, that is spaced apart from the plurality of relay nodes. However, this is not required, and it also is within the scope of the present disclosure that the sensing at 210 may include sensing with, via, and/or utilizing one or more relay node of the plurality of relay nodes. Examples of the property that is related to the elongate tubular body and/or of components of the sensor node are disclosed herein with reference to sensor node 170.

As a more specific example, the sensing at 210 may include sensing with and/or via the first acoustic wave. Under these conditions, the sensor node may be configured to detect and/or determine a change in the first acoustic wave, as a function of time and/or over time, that may be indicative of the property that is related to the elongate tubular body.

As another more specific example, the sensing at 210 may include inducing, within the elongate tubular body and with a sensor electro-acoustic transmitter of the sensor node, a sense acoustic wave. The sense acoustic wave may be indicative of the property related to the elongate tubular body and may include and/or be any suitable acoustic wave, examples of which include a compressive acoustic wave, a shear acoustic wave, a non-dispersive guided acoustic wave, a longitudinal acoustic wave, and/or an in-plane torsional shear acoustic wave. The sensing at 210 further may include conveying the sense acoustic wave to a first electro-acoustic receiver of a first relay node of the plurality of relay nodes via the elongate tubular body. The sensing at 210 also may include receiving the sense acoustic wave from the elongate tubular body with the first electro-acoustic receiver.

When methods 200 include the sensing at 210, the data that is transmitted among the plurality of relay nodes may include and/or be indicative of the property related to the elongate tubular body. Stated another way, the inducing at 220 may be based, at least in part, on the sense acoustic wave and/or may be initiated responsive to receipt of the sense acoustic wave by the first electro-acoustic receiver.

Inducing the first acoustic wave at 220 may include inducing the first acoustic wave within the elongate tubular body. The inducing at 220 also may include inducing the first acoustic wave with a first electro-acoustic transmitter array of the first relay node. The first acoustic wave is indicative of the data and includes, primarily includes, includes a majority of, consists of, and/or consists essentially of a first non-dispersive guided acoustic wave (NDGAW), examples of which are disclosed herein. Stated another way, the first electro-acoustic transmitter array is specifically adapted, configured, designed, and/or constructed to preferentially generate and/or induce NDGAWs within the elongate tubular body. As discussed in more detail herein, such NDGAWs may propagate, within the elongate tubular body, over a greater distance than dispersive acoustic waves, thereby permitting the communication networks, relay nodes, and methods disclosed herein to operate with fewer relay nodes and/or with greater spacing between relay nodes when compared to prior art wireless data transmission networks that do not utilize NDGAWs for communication among the relay nodes that may be associated therewith.

It is within the scope of the present disclosure that the inducing at 220 may include inducing any suitable first acoustic wave. As an example, the inducing at 220 may include inducing a first ultrasonic wave within the elongate tubular body. As another example the inducing at 220 may include inducing an acoustic wave with a frequency of at least 20 kilohertz (kHz), at least 30 kHz, at least 40 kHz, at least 50 kHz, at least 75 kHz, at least 100 kHz, at most 200 kHz, at most 175 kHz, at most 150 kHz, at most 125 kHz, or at most 100 kHz.

As discussed in more detail herein with reference to FIGS. 5-8 and 10, the first electro-acoustic transmitter array may include a plurality of first electro-acoustic transmitters circumferentially spaced apart about a perimeter of the elongate tubular body. Under these conditions, the inducing at 220 may include cooperatively and/or collectively inducing the first acoustic wave with, via, and/or utilizing the plurality of first electro-acoustic transmitters. Additionally or alternatively, and as discussed in more detail herein with reference to FIG. 9, the first electro-acoustic transmitter array may include a first ring that circumferentially extends about the perimeter of the elongate tubular body. Under these conditions, the inducing at 220 may include inducing the first acoustic wave with, via, and/or utilizing the first ring.

Conveying the first acoustic wave at 230 may include conveying the first acoustic wave via, through, within, and/or utilizing the elongate tubular body. The conveying at 230 also may include conveying the first acoustic wave to a second relay node of the plurality of relay nodes, and the second relay node may be spaced apart from the first relay node along a longitudinal axis, an elongate axis, or a length of the elongate tubular body. Stated another way, a portion, or sub-region, of the elongate tubular body may extend between, or separate, the first relay node and the second relay node; however, neither the first relay node nor the second relay node is required to intersect, or be partially coextensive with, the longitudinal axis of the elongate tubular body.

It is within the scope of the present disclosure that the first acoustic wave may be conveyed between the first relay node and the second relay node primarily by, or within, the elongate tubular body. Stated another way, the conveying at 230 may consist essentially of conveying the first acoustic wave within, or via vibration of, the elongate tubular body, such as by generating a first vibration within the elongate tubular body. This may include generating the first vibration such that the first vibration propagates along, or parallel to, the longitudinal axis of the elongate tubular body and/or generating the first vibration such that the first vibration generates motion within the elongate tubular body and along an axis that is perpendicular to, or rotates around, the longitudinal axis of the elongate tubular body.

It is within the scope of the present disclosure that the conveying at 230 may include conveying the first acoustic wave over any suitable first conveyance distance, or first distance. As examples, the first distance may be at least 1 meter (m), at least 2 m, at least 5 m, at least 10 m, at least 15 m, at least 20 m, at least 25 m, at least 30 m, at least 40 m, at least 50 m, or at least 60 m.

Receiving the first acoustic wave at 240 may include receiving the first acoustic wave with a second electro-acoustic receiver of the second relay node. Examples of the second electro-acoustic receiver are disclosed herein. The receiving at 240 may include receiving at least a portion of the first NDGAW with the second electro-acoustic receiver. Additionally or alternatively, and as discussed herein with reference to FIG. 2, the elongate tubular body may include a first reflection point. Under these conditions, the conveying at 230 may include converting at least a portion of the first acoustic wave to a first reflected acoustic wave responsive to reflection of the first acoustic wave at the first reflection point, and the receiving the first acoustic wave may include receiving at least a portion of the first reflected acoustic wave with the second electro-acoustic receiver.

Inducing the second acoustic wave at 250 may include inducing the second acoustic wave within the elongate tubular body and/or with a second electro-acoustic transmitter of the second relay node. The second acoustic wave may consist essentially of a second NDGAW, and the inducing at 250 may be, or may be initiated, responsive to receipt of the first acoustic wave by the second electro-acoustic receiver of the second relay node.

It is within the scope of the present disclosure that the inducing at 250 may include inducing any suitable second acoustic wave. As an example, the inducing at 250 may include inducing a second ultrasonic wave within the elongate tubular body. As another example the inducing at 250 may include inducing a second acoustic wave with a frequency of at least 20 kilohertz (kHz), at least 30 kHz, at least 40 kHz, at least 50 kHz, at least 75 kHz, at least 100 kHz, at most 200 kHz, at most 175 kHz, at most 150 kHz, at most 125 kHz, or at most 100 kHz.

As discussed in more detail herein with reference to FIGS. 5-8 and 10, the second electro-acoustic transmitter array may include a plurality of second electro-acoustic transmitters circumferentially spaced apart about a perimeter of the elongate tubular body. Under these conditions, the inducing at 250 may include cooperatively and/or collectively inducing the second acoustic wave with, via, and/or utilizing the plurality of second electro-acoustic transmitters. Additionally or alternatively, and as discussed in more detail herein with reference to FIG. 9, the second electro-acoustic transmitter array may include a second ring that circumferentially extends about the perimeter of the elongate tubular body. Under these conditions, the inducing at 220 may include inducing the second acoustic wave with, via, and/or utilizing the second ring.

Conveying the second acoustic wave at 260 may include conveying the second acoustic wave via, through, within, and/or utilizing the elongate tubular body. The conveying at 260 also may include conveying the second acoustic wave to a third relay node of the plurality of relay nodes, and the third relay node may be spaced apart from both the first relay node and the second relay node along the longitudinal axis of the elongate tubular body.

It is within the scope of the present disclosure that the second acoustic wave may be conveyed between the second relay node and the third relay node primarily by, or within, the elongate tubular body. Stated another way, the conveying at 260 may consist essentially of conveying the second acoustic wave within, or via vibration of, the elongate tubular body, such as by generating a second vibration within the elongate tubular body. This may include generating the second vibration such that the second vibration propagates along, or parallel to, the longitudinal axis of the elongate tubular body and/or generating the second vibration such that the second vibration generates motion within the elongate tubular body and along an axis that is perpendicular to, or rotates around, the longitudinal axis of the elongate tubular body.

It is within the scope of the present disclosure that the conveying at 260 may include conveying the second acoustic wave over any suitable second conveyance distance, or second distance. As examples, the second distance may be at least 1 meter (m), at least 2 m, at least 5 m, at least 10 m, at least 15 m, at least 20 m, at least 25 m, or at least 30 m.

Receiving the second acoustic wave at 270 may include receiving the second acoustic wave with a third electro-acoustic receiver of the third relay node. Examples of the third electro-acoustic receiver are disclosed herein. The receiving at 270 may include receiving at least a portion of the second NDGAW with the third electro-acoustic receiver. Additionally or alternatively, and as discussed herein with reference to FIG. 2, the elongate tubular body may include a second reflection point. Under these conditions, the conveying at 260 may include converting at least a portion of the second acoustic wave to a second reflected acoustic wave responsive to reflection of the second acoustic wave at the second reflection point, and the receiving the second acoustic wave may include receiving at least a portion of the second reflected acoustic wave with the third electro-acoustic receiver.

Repeating at least the portion of the methods at 280 may include repeating any suitable portion of methods 200 in any suitable manner. As an example, the plurality of relay nodes may include a number of relay nodes sufficient to transmit the data along a majority, or even an entirety, of a length of the elongate tubular body. Under these conditions, the repeating at 280 may include repeating at least the inducing at 220, the conveying at 230, and the receiving at 240 with one or more subsequent, or additional, relay nodes to convey the data along the majority, or even the entirety, of the length of the elongate tubular body.

The elongate tubular body may have and/or define any suitable length. As examples, the length of the elongate tubular body may be at least 1 meter, at least 50 meters, at least 100 meters, at least 250 meters, at least 500 meters, or at least 1000 meters.

The plurality of relay nodes may include any suitable number of relay nodes. As examples, the plurality of relay nodes may include at least 3, at least 5, at least 10, at least 20, at least 30, at least 40, or at least 50 relay nodes spaced apart along the length of the elongate tubular body.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

INDUSTRIAL APPLICABILITY

The communication networks, relay nodes, and methods disclosed herein are applicable to the oil and gas industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method of transmitting data among a plurality of relay nodes spaced apart along an elongate tubular body, the method comprising:

inducing, within the elongate tubular body and with a first electro-acoustic transmitter array of a first relay node of the plurality of relay nodes, a first acoustic wave, which is indicative of the data and consists essentially of a first directionally oriented non-dispersive guided acoustic wave (NDGAW) at an ultrasonic frequency of greater than 20 kHz;

conveying, via the elongate tubular body, the first acoustic wave to a second relay node of the plurality of relay nodes, wherein the second relay node is spaced apart from the first relay node along a longitudinal axis of the elongate tubular body;

receiving the first acoustic wave with a second electro-acoustic receiver of the second relay node;

responsive to the receiving the first acoustic wave, inducing, within the elongate tubular body and with a second electro-acoustic transmitter array of the second relay node, a second acoustic wave, which is indicative of the data and consists essentially of a second directionally oriented NDGAW at an ultrasonic frequency of greater than 20 kHz;

conveying, via the elongate tubular body, the second acoustic wave to a third relay node of the plurality of relay nodes, wherein the third relay node is spaced apart from both the first relay node and the second relay node along the longitudinal axis of the elongate tubular body; and receiving the second acoustic wave with a third electro-acoustic receiver of the third relay node;

wherein each of the first NDGAW and the second NDGAW includes a torsional acoustic wave mode and a longitudinal acoustic wave mode and the second NDGAW is responsive to the first NDGAW; and wherein prior to the inducing, the method further comprises sensing a property related to the elongate tubular body, the data being indicative of the property related to the elongate tubular body.

2. The method of claim 1, wherein the receiving the first acoustic wave includes receiving a portion of the first NDGAW with the second electro-acoustic receiver, and wherein the receiving the second acoustic wave includes receiving a portion of the second NDGAW with the third electro-acoustic receiver.

3. The method of claim 1, wherein the elongate tubular body includes a first reflection point that is not an electroacoustic receiver, wherein the conveying the first acoustic wave includes converting at least a portion of the first acoustic wave to a first reflected acoustic wave responsive to reflection of the first acoustic wave at the first reflection point, wherein the first reflected wave has a different mode than the first acoustic wave, and further wherein the receiving the first acoustic wave includes receiving at least a portion of the first reflected acoustic wave with the second electro-acoustic receiver.

4. The method of claim 1, wherein the property related to the elongate tubular body includes at least one of a measure of scale formation within the elongate tubular and a measure of hydrate formation within the elongate tubular body.

5. The method of claim 1, wherein the sensing includes sensing with a sensor node that is spaced apart from the plurality of relay nodes.

6. The method of claim 5, wherein the method further includes:
(i) inducing, within the elongate tubular body and with a sensor electro-acoustic transmitter of the sensor node, a sense acoustic wave, which is indicative of the property related to the elongate tubular body;
(ii) conveying, via the elongate tubular body, the sense acoustic wave to a first electro-acoustic receiver of the first relay node; and
(iii) receiving, via the elongate tubular body, the sense acoustic wave with the first electro-acoustic receiver of the first relay node, wherein the inducing the first acoustic wave is based, at least in part, on the receiving the sense acoustic wave.

7. The method of claim 1, wherein the first electro-acoustic transmitter array includes a plurality of first electro-acoustic transmitters that is circumferentially spaced apart about a perimeter of the elongate tubular body, and further wherein the inducing the first NDGAW at an ultrasonic frequency of greater than 20 kHz includes inducing said NDGAW with the plurality of first electro-acoustic transmitters within and along the elongate tubular body.

8. A communication network, comprising:
an elongate tubular body; and
a wireless data transmission network including a plurality of relay nodes, wherein the wireless data transmission network:
(i) includes a first relay node of the plurality of relay nodes, wherein the first relay node includes a first electro-acoustic transmitter array, which is configured to induce a first non-dispersive guided acoustic wave (NDGAW) at an ultrasonic frequency of greater than 20 kHz within the elongate tubular body, and a first electro-acoustic receiver;
(ii) includes a second relay node of the plurality of relay nodes, wherein the second relay node includes a second electro-acoustic transmitter array, which is configured to induce a second NDGAW at an ultrasonic frequency of greater than 20 kHz within the elongate tubular body, and a second electro-acoustic receiver, which is configured to receive the first NDGAW at an ultrasonic frequency of greater than 20 kHz from the elongate tubular body;
(iii) includes a third relay node of the plurality of relay nodes, wherein the third relay node includes a third electro-acoustic transmitter array and a third electro-acoustic receiver, which is configured to receive the second NDGAW at an ultrasonic frequency of greater than 20 kHz from the elongate tubular body; and
(iv) is programmed to transmit data among the first relay node, the second relay node, and the third relay node utilizing the method of claim 1.

9. The communication network of claim 8, wherein the communication network further includes a sense acoustic wave within the elongate tubular body.

10. The communication network of claim 8, wherein at least one of the first electro-acoustic transmitter array, the second electro-acoustic transmitter array, and the third electro-acoustic transmitter array includes a plurality of electro-acoustic transmitters that is circumferentially spaced-apart about a perimeter of the elongate tubular body to generate a NDGAW within and along the elongate tubular body at an ultrasonic frequency of greater than 20 kHz.

11. The communication network of claim 8, wherein at least one of:
(i) the second electro-acoustic receiver is configured to receive the first NDGAW at an ultrasonic frequency of greater than 20 kHz from the first electro-acoustic transmitter array;
(ii) the third electro-acoustic receiver is configured to receive the second NDGAW at an ultrasonic frequency of greater than 20 kHz from the second electro-acoustic transmitter array;
(iii) the second electro-acoustic receiver further is configured to receive a first reflected acoustic wave from a first reflection point; and
(iv) the third electro-acoustic receiver further is configured to receive a second reflected acoustic wave from a second reflection point.

12. The communication network of claim 8, wherein at least one of the first electro-acoustic receiver, the second electro-acoustic receiver, and the third electro-acoustic receiver includes an electro-acoustic receiver array including a plurality of electro-acoustic receivers that is circumferentially spaced-apart about a perimeter of the elongate tubular body to generate a NDGAW within and along the elongate tubular body at an ultrasonic frequency of greater than 20 kHz.

13. A relay node configured to transmit a transmitted acoustic wave along an elongate tubular body and to receive a received acoustic wave from the elongate tubular body in accordance to the method of claim 1, the relay node comprising:
   an electro-acoustic transmitter array including at least 3 electro-acoustic transmitters, wherein the at least 3 electro-acoustic transmitters is circumferentially spaced-apart about a perimeter of the elongate tubular body, wherein the at least 3 electro-acoustic transmitters is configured to induce the transmitted acoustic wave, in the form of a non-dispersive guided acoustic wave (NDGAW) at an ultrasonic frequency of greater than 20 kHz, the NDGAW including a torsional acoustic wave mode and a longitudinal acoustic wave mode, within and along the elongate tubular body; and
   an electro-acoustic receiver that is circumferentially spaced-apart from the at least 3 electro-acoustic transmitters about the perimeter of the elongate tubular body, wherein the electro-acoustic receiver is configured to receive the received acoustic wave from the elongate tubular body.

14. The relay node of claim 13, wherein each respective electroacoustic transmitter of the electro-acoustic transmitter array includes at least one of a respective piezoelectric transmitter stack, a respective piezoelectric transmitter stack that includes at least 1 stacked piezoelectric transmitter wafer, a respective in-plane shear d36-type PMNT piezoelectric wafer, and a respective electromagnetic acoustic transmitter to generate an NDGAW at an ultrasonic frequency of greater than 20 kHz.

15. The relay node of claim 13, wherein the electro-acoustic receiver includes at least one of a piezoelectric receiver stack, a piezoelectric receiver stack that includes at least 1 stacked piezoelectric receiver wafer, a respective in-plane shear d36-type PMNT piezoelectric wafer, and an electromagnetic acoustic receiver to generate a NDGAW at an ultrasonic frequency of greater than 20 kHz.

16. The relay node of claim 13, wherein the electro-acoustic receiver includes:
   (i) a reflected acoustic wave receiver, which is configured to receive a reflected acoustic wave from the elongate tubular body, the reflected acoustic wave being reflected at a reflection point that is not an electro-acoustic receiver; and
   (ii) an NDGAW receiver, which is configured to receive an NDGAW from the elongate tubular body, wherein the reflected acoustic wave receiver is different from the NDGAW receiver.

17. The relay node of claim 13, wherein a single transverse cross-section of the elongate tubular body intersects each of the at least 3 electro-acoustic transmitters and the electro-acoustic receiver.

18. The method of claim 1, wherein each of the first NDGAW and the second NDGAW includes a torsional acoustic wave $T(0,1)$ mode and a longitudinal acoustic wave $L(0,2)$ mode.

19. The method of claim 1, wherein each of the first NDGAW and the second NDGAW includes a longitudinal acoustic wave mode.

20. The method of claim 1, wherein the data is transmitted over a frequency range.

21. The method of claim 1, wherein the data transmission is data transmission is in both an uphole direction and in a downhole direction within a hydrocarbon well.

* * * * *